United States Patent
Okita et al.

(10) Patent No.: US 7,826,393 B2
(45) Date of Patent: Nov. 2, 2010

(54) MANAGEMENT COMPUTER AND COMPUTER SYSTEM FOR SETTING PORT CONFIGURATION INFORMATION

(75) Inventors: Hideki Okita, Tachikawa (JP); Yoji Ozawa, Kokubunji (JP); Takashi Sumiyoshi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 11/819,308

(22) Filed: Jun. 26, 2007

(65) Prior Publication Data

US 2008/0056161 A1 Mar. 6, 2008

(30) Foreign Application Priority Data

Aug. 29, 2006 (JP) ............................. 2006-232304

(51) Int. Cl.
*H04L 12/28* (2006.01)
(52) U.S. Cl. ..................................... 370/254; 370/420
(58) Field of Classification Search .................. None
See application file for complete search history.

(56) References Cited

U.S. PATENT DOCUMENTS

| 2003/0204509 A1* | 10/2003 | Dinker et al. ............... 707/100 |
| 2005/0234683 A1* | 10/2005 | Graves et al. .................. 703/1 |
| 2006/0164199 A1* | 7/2006 | Gilde et al. .................. 336/234 |
| 2006/0274674 A1 | 12/2006 | Okita et al. |
| 2006/0274774 A1* | 12/2006 | Srinivasan et al. .......... 370/420 |
| 2007/0076634 A1 | 4/2007 | Sumiyoshi et al. |
| 2007/0086363 A1* | 4/2007 | Wakumoto et al. .......... 370/255 |

FOREIGN PATENT DOCUMENTS

JP 2006-340161 6/2005

* cited by examiner

*Primary Examiner*—Chirag G Shah
*Assistant Examiner*—Minh-Trang Nguyen
(74) *Attorney, Agent, or Firm*—Stites & Harbison PLLC; Juan Carlos A. Marquez, Esq.

(57) ABSTRACT

Provided is a computer system capable of cutting the cost of running and managing a company network and improving the security of the network by reducing wrong settings and skipped settings due to human factor. The computer system has switches which constitute a network, a management computer which is connected to the network and manages the network, and clients which are connected to the switches. The management computer sets each switch such that client authentication is executed at port provided in the switch that can be connected to the client. The client authentication is processing of verifying whether the client has the right to connect to the network.

20 Claims, 21 Drawing Sheets

| SWITCH | PORT | CONNECTED SWITCH |
|---|---|---|
| A | 1 | B |
| A | 3 | C |
| B | 1 | Z |
| B | 4 | A |
| C | 1 | D |
| C | 4 | A |
| D | 4 | C |
| Z | 4 | B |

*FIG. 7*

| PORT NUMBER | AUTHENTICATION |
|---|---|
| 1 | YES |
| 2 | YES |
| 3 | YES |
| 4 | NO |

*FIG. 8*

| | 5001 | 5002 | 5003 | 5004 | 500 |
|---|---|---|---|---|---|
| | SOURCE SWITCH | SOURCE PORT | CONNECTED SWITCH | CONNECTED PORT | |
| | C | 1 | NULL | NULL | |

FIG. 16

| | 1701 | 1702 | 1703 | 1704 | 1704 | 1700A |
|---|---|---|---|---|---|---|
| | EVENT TYPE | SOURCE SWITCH | SOURCE PORT | CONNECTED SWITCH | CONNECTED PORT | |
| | ADDITION | C | 3 | E | 4 | |

FIG. 17A

| | 1701 | 1702 | 1703 | 1700B |
|---|---|---|---|---|
| | EVENT TYPE | SOURCE SWITCH | SOURCE PORT | |
| | REMOVAL | C | 1 | |

FIG. 17B

| SOURCE MAC ADDRESS | VLAN IDENTIFIER |
|---|---|
| aa:aa:aa:aa:aa:aa | 10 |
| bb:bb:bb:bb:bb:bb | 10 |
| cc:cc:cc:cc:cc:cc | 20 |
| dd:dd:dd:dd:dd:dd | 30 |

FIG. 23

MANAGEMENT COMPUTER AND COMPUTER SYSTEM FOR SETTING PORT CONFIGURATION INFORMATION

CLAIM OF PRIORITY

The present application claims priority from Japanese patent application P2006-232304 filed on Aug. 29, 2006, the content of which is hereby incorporated by reference into this application.

BACKGROUND OF THE INVENTION

This invention relates to a management computer for managing a network and, more particularly, to a management computer that sets a client authentication technique in a switch constituting a network.

Ensuring network security is important in building a network today, particularly a company network. Many companies therefore introduce to their networks a router or switch (hereinafter collectively referred to as switch) with a client authentication function for verifying whether or not a user terminal (hereinafter referred to as client) has the right to connect to the network. The switch with a client authentication function does not allow a client that is not authorized to access the network to connect to the network, and sequesters this client to a separate network.

The switch with a client authentication function uses client identifiers which are registered in the switch in advance in verifying whether or not a client connected to the switch has the right to connect to the network. The switch with a client authentication function may verify whether or not a client has the right to connect to the network by judging whether or not a part of an electronic certificate sent from the client matches a part of an electronic dictionary stored in the switch in advance.

Client authentication is constituted of an authentication process and a permission process. The authentication process is a process of identifying a client that is connected to the switch and verifying whether or not the identified client has the right to connect to the network. The permission process is a process of allowing a successfully authenticated client to communicate with other clients in the network.

A system defined by IEEE 802.1X is known as a typical client authentication system. This client authentication system has a switch serving as an access point at which a client connects to a network and an authentication server for authenticating the client.

In client authentication according to IEEE 802.1X, the switch receives from a client a request to connect to a network and forwards the connection request to a remote authentical dial-in user service (RADIUS) server, which is an authentication server. Receiving the connection request, the RADIUS server performs authentication to verify whether or not the client has the right to connect to the network, and sends the result of the authentication to the switch. The switch receives the authentication result and, in response to the received authentication result, determines whether to relay a frame sent from the client.

Also known are a dynamic virtual local area network (VLAN) and other similar technologies that use IEEE 802.1X client authentication to execute simultaneously processing of authenticating a client and processing of adding the client to a corresponding VLAN.

Specifically, the switch forwards, to the RADIUS server of the authentication server, a request sent from a client to connect to a network. Receiving the connection request, the RADIUS server performs authentication to verify whether or not the client has the right to connect to the network, and determines to which VLAN the client belongs. The RADIUS server then incorporates the identifier of the VLAN to which the client belongs in the result of the authentication, and sends the authentication result to the switch. The switch receives the authentication result and, in response to the VLAN identifier contained in the authentication result, allocates the VLAN to which the client belongs to a port that is connected to the client.

Another technology is also known as a technology which combines the client authentication function by IEEE 802.1X with an MAC-VLAN function, which, based on the MAC addresses of multiple clients that are connected to the same port provided in a switch, adds a client to a VLAN designated in advance.

Conventional client authentication technologies, which require a person in charge of running and managing a network to set in each switch information about whether client authentication is necessary, have two problems.

One is that the necessity of setting the information in each switch increases the workload of a person in charge of running and managing a network. The other problem is that error made by a person in charge of running and managing a network in setting the information in each switch could degrade the security of the network.

The former problem will be described first.

In introducing a new client authentication function to a network that is already up and running, or in introducing a client authentication function to a newly built network, a person in charge of running and managing the network needs to update or crate a configuration for controlling switch operation for each switch that constitutes the network.

The person in charge of running and managing the network also needs to check whether the updated or generated configuration is consistent with the configuration prior to the update or the creation, and whether the configuration of one switch is consistent with the configuration of another switch.

Networks are increasing in scale and complexity as more and more business and other activities are now conducted over network. The increase in network scale and complexity is accompanied by an increase in number of switches per network.

A person in charge of running and managing a network therefore has to perform the task of checking configuration consistency between switches on that much more switches, which increases the workload of the person in charge of running and managing a network.

The latter problem will be described next.

Client authentication is a technology for allowing only a client that has the right to connect to a network to access the network. Network security is thus ensured. Error made by a person in charge of running and managing a network in setting a switch configuration can therefore degrade the network security.

For instance, the security of a network is degraded if a person in charge of running and managing the network erroneously sets a configuration such that client authentication is not executed at a port where client authentication should be executed.

Network security can also be degraded when a person in charge of running and managing a network forgets to include, in a configuration, client authentication that should be executed in one of switches or one of ports. A specific example of such cases is when a person in charge of running and managing a network forgets to apply a switch configuration to a switch.

In conventional client authentication technologies where whether or not client authentication is executed at a port provided in a switch is set manually, wrong settings and skipped settings due to human factor are unavoidable. Conventional client authentication technologies therefore have a possibility of degrading network security. The possibility of degrading network security can be reduced only through more diligent checking by a person in charge of running and managing a network.

SUMMARY OF THE INVENTION

This invention has been made to solve the above two problems, and it is therefore an object of this invention to improve network security by reducing wrong settings and skipped settings due to human factor while cutting the cost of running and managing a company network.

According to one embodiment of the invention, there is therefore provided a management computer for managing switches included in a network, comprising: a processor for executing computing; a memory connected to the processor; and an interface connected to the processor and the network, wherein the memory stores configuration information for controlling the switches, network topology information indicating a connection between the switches, and ports configuration information indicating, for each switch, whether client authentication is executed at each port provided in the switch, the client authentication being processing of verifying whether a client connected to the port provided in the switch has right to connect to the network, and wherein the processor is configured to: judge, based on the network topology information, for each port provided in each switch, whether the client authentication is executed; and set, in the ports configuration information, based on a result of the judging, whether to execute the client authentication at the port.

According to this embodiment of the invention, the cost of running and managing a network is cut by reducing the workload of a person in charge of running and managing the network. This also prevents degradation of network security that results from wrong settings and skipped settings due to human factor.

BRIEF DESCRIPTION OF THE DRAWINGS

The present invention can be appreciated by the description which follows in conjunction with the following figures, wherein:

FIG. 7 is a diagram showing network topology information according to the first embodiment of this invention;

FIG. 8 is a diagram showing ports configuration information that is associated with the switch according to the first embodiment of this invention;

FIG. 16 is a diagram showing link state information according to the second embodiment of this invention;

FIG. 17A is a diagram showing the link state information according to the second embodiment of this invention;

FIG. 17B is a diagram showing the link state information according to the second embodiment of this invention;

FIG. 23 is a diagram showing the configuration of the MAC VLAN allocation information according to the fourth embodiment of this invention;

DETAILED DESCRIPTION OF THE PREFERRED EMBODIMENTS

First Embodiment

A network operation management system according to a first embodiment of this invention will be described with reference to FIGS. 1 to 9.

Figure 1:
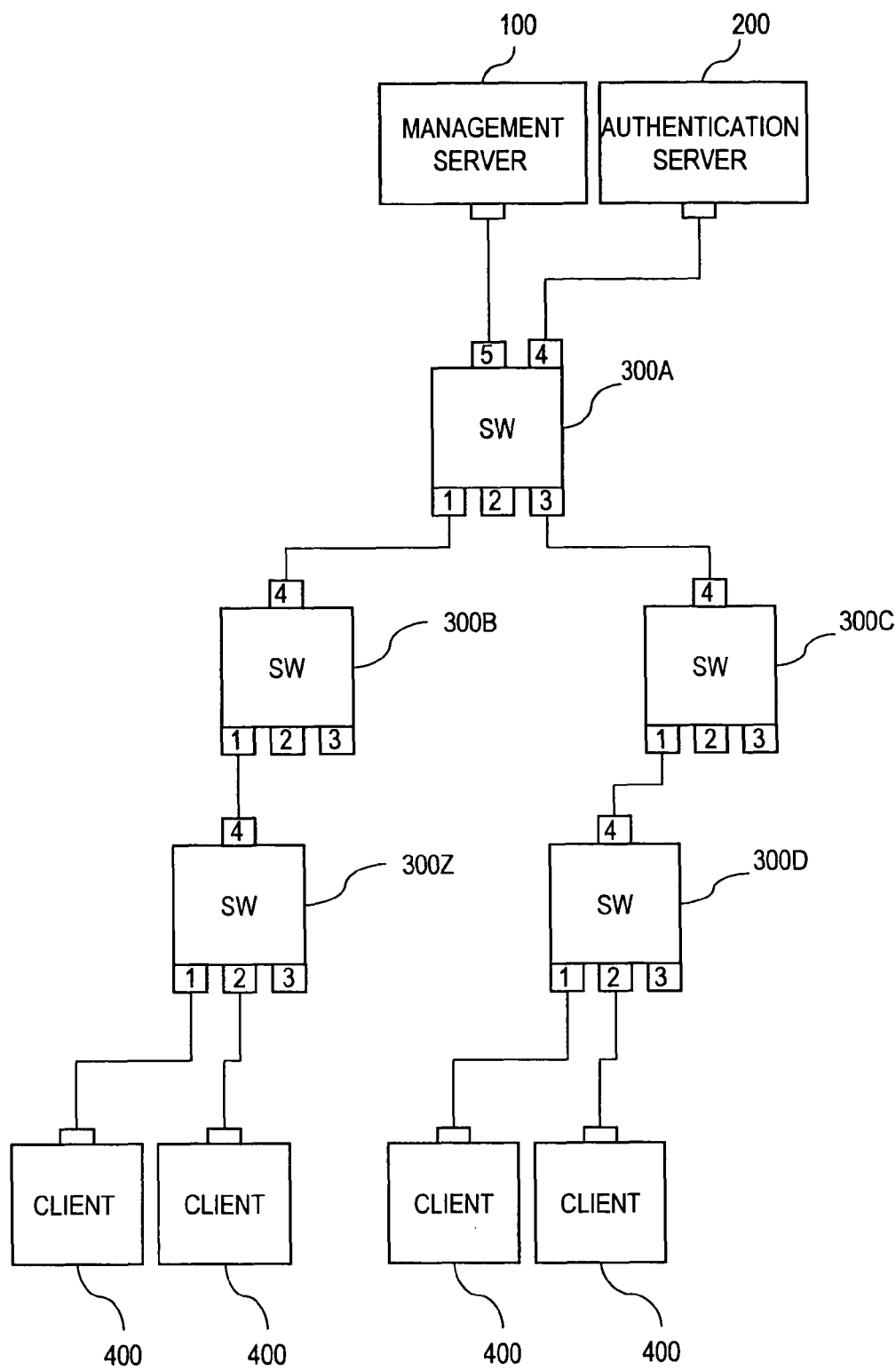
FIG. 1 is a diagram showing the configuration of a network operation management system according to a first embodiment of this invention.

FIG. 1 is a diagram showing the configuration of the network operation management system according to the first embodiment of this invention.

The network operation management system according to the first embodiment of this invention has a management server 100, an authentication server 200, and multiple switches 300A to 300Z, and clients 400. The switches 300A to 300Z will collectively be referred to as switch 300. The switches in this embodiment may be replaced by routers.

The management server 100, the authentication server 200, and the clients 400 are connected to a network constituted of the switches 300.

The management server 100 is a computer that manages the network. Specifically, the management server 100 gathers network topology information. Based on an instruction from an administrator or the gathered network topology information, or both, the management server 100 generates configurations 1150 as settings information of the respective switches 300 in the network. The management server 100 sends the generated configurations 1150 to the corresponding switches 300 to apply the generated configurations 1150 to configurations 3110 stored in the respective switches 300. Details of the management server 100 will be described with reference to FIG. 2.

The authentication server 200 is a computer that performs authentication to verify whether or not the clients 400 have the right to connect to the network, and has a CPU, a storage unit, and a network interface, which are not shown in the drawings.

The switches 300 are devices that transfer information communicated within the network to the destination of the information. The switches 300 each have multiple ports. For example, the switch 300B has ports 1 to 4. The port 1 provided in the switch 300B is connected to the switch 300Z. The port 4 provided in the switch 300B is connected to the switch 300A. The port 2 and the port 3 provided in the switch 300B are ports to which the clients 400 can be connected.

The switches 300 enable the client authentication function at ports that are designated in the configurations 3110 applied by the management server 100. When the client authentication function is enabled at a port provided in one switch 300, the switch 300 controls whether the client(s) 400 connected to this port can connect to the network.

Specifically, each client 400 that is connected to the port where the client authentication function is enabled sends a connection request to the authentication server 200 via the switch 300. The authentication server 200 receives the connection request and performs authentication to verify whether or not the client 400 has the right to connect to the network. When the client 400 is authenticated as one that has the right to connect to the network, the authentication server 200 sends an authentication result that grants access to the network to the switch 300 connected to this client 400. On the other hand, when the authentication reveals that the client 400 does not have the right to connect to the network, the authentication server 200 sends an authentication result that denies access to the network to the switch 300 connected to this client 400.

Receiving the authentication result that grants access to the network, the switch 300 allows the client 400 to connect to the network. When the received authentication result is one that denies access to the network, the switch 300 does not allow the client 400 to connect to the network.

Each client 400 is a computer having a CPU, a storage unit, and a network interface, which are not shown in the drawings. The client 400 can be a personal computer, a cellular phone, or the like.

Figure 2:
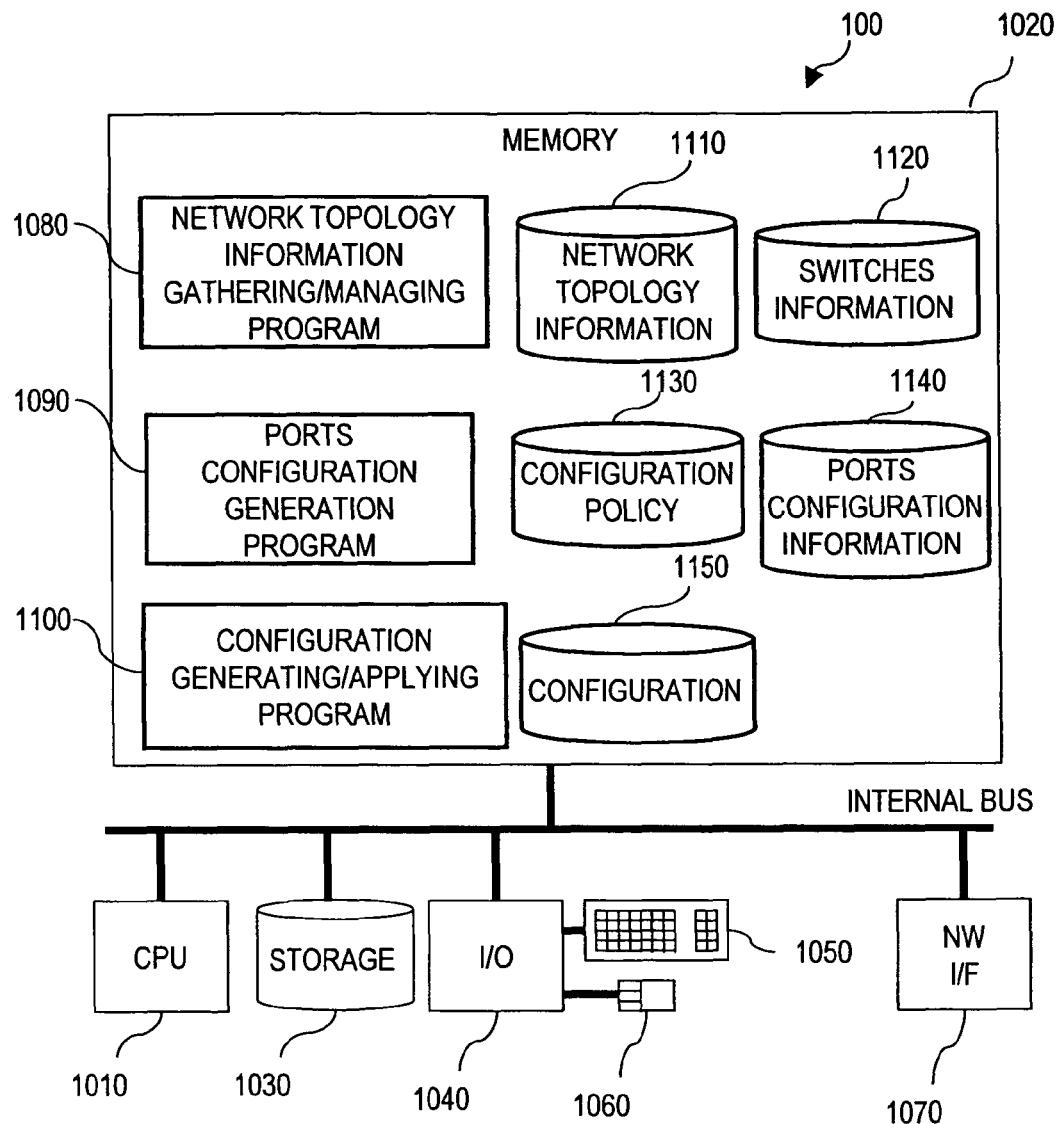
FIG. 2 is a block diagram of a management server according to the first embodiment of this invention.

FIG. 2 is a block diagram of the management server 100 according to the first embodiment of this invention.

The management server 100 has a CPU 1010, a memory 1020, a storage 1030, an input/output (I/O) interface 1040, and a network interface (NW I/F) 1070. The CPU 1010, the memory 1020, the storage 1030, the I/O interface 1040, and the network interface 1070 are interconnected by an internal bus.

The storage 1030 is, for example, a hard disk drive (HDD). I/O interface 1040 can be connected to Input/output devices. Connected to the I/O interface 1040 are a keyboard 1050, a mouse 1060, and the like. The management server 100 exchanges packets with the switches 300 in the network via the NW I/F 1070.

The memory 1020 stores a network topology information gathering/managing program 1080, a ports configuration generation program 1090, a configuration generating/applying program 1100, network topology information 1110, switches information 1120, configuration policy 1130, ports configuration information 1140, and the configuration 1150.

The CPU 1010 reads the network topology information gathering/managing program 1080, the ports configuration generation program 1090, and the configuration generating/applying program 1100 out of the memory 1020, and executes the programs.

The network topology information gathering/managing program 1080 gathers the network topology information 1110 and manages the gathered network topology information 1110. The ports configuration generation program 1090 edits the ports configuration information 1140. The configuration generating/applying program 1100 generates one configuration 1150 for each switch 300, sends the generated configurations 1150 to the respective switches 300, and applies the generated configurations 1150 to the configurations 3110 stored in the respective switches 300.

The network topology information 1110 shows the connection relation between the switches 300 in the network. Details of the network topology information 1110 will be described with reference to FIG. 7. The switches information 1120 shows whether or not the individual switches 300 have a client authentication function. Details of the switches information 1120 will be described with reference to FIG. 6.

The configuration policy 1130 is set by the administrator. Exceptional conditions and the like are set in the configuration policy 1130. To give a specific example, switches and ports for which whether or not client authentication function is executed is not set automatically are set in the configuration policy 1130.

Registered in the ports configuration information 1140 for each switch 300 is information that indicates, for each port provided in the switch 300, whether or not the port executes client authentication function. Details of the ports configuration information 1140 will be described with reference to FIG. 8. The configurations 1150 show the settings of the respective switches 300.

Figure 3:
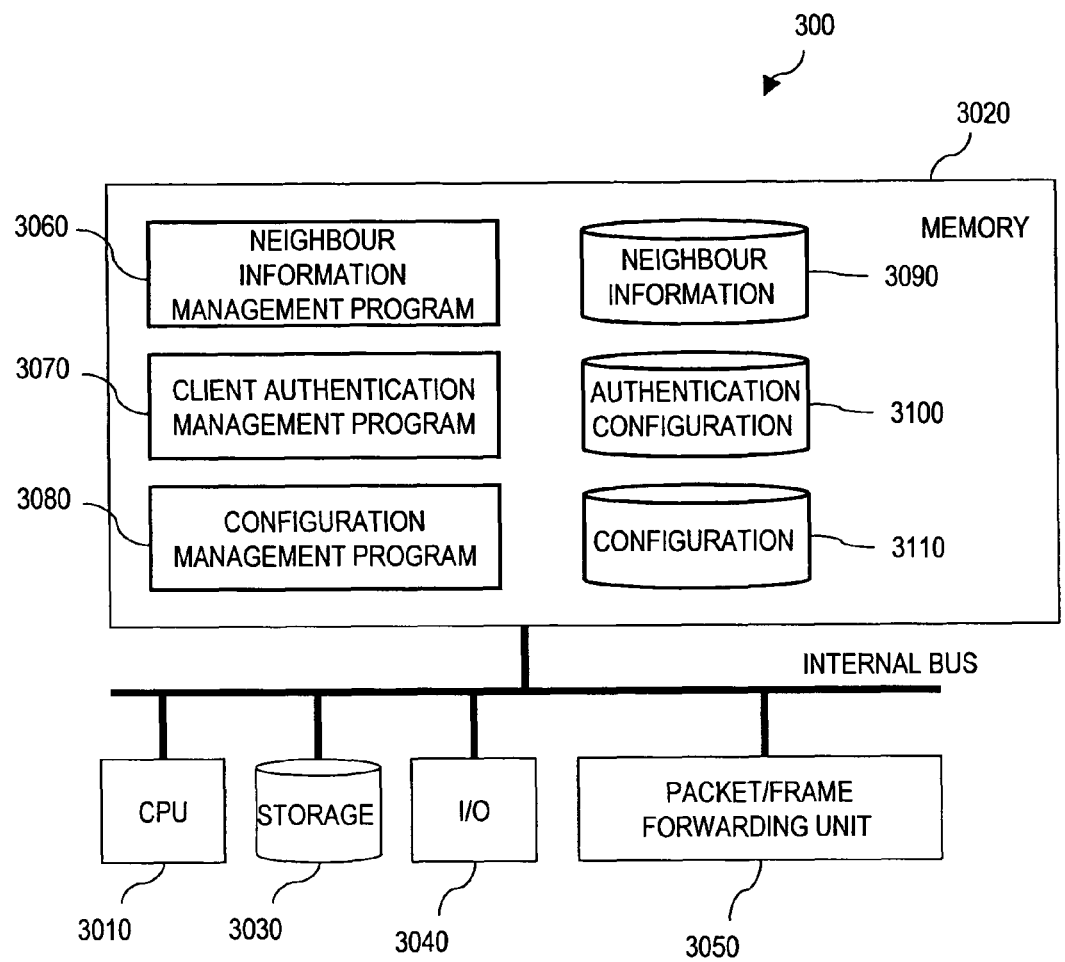
FIG. 3 is a block diagram of a switch according to the first embodiment of this invention.

FIG. 3 is a block diagram of the switch 300 according to the first embodiment of this invention.

The switch 300 has a CPU 3010, a memory 3020, a storage 3030, an I/O interface 3040, and a packet/frame forwarding unit 3050. The CPU 3010, the memory 3020, the storage 3030, the I/O interface 3040, and the packet/frame forwarding unit 3050 are interconnected by an internal bus. The storage 3030 is, for example, a flash memory.

When a packet or a frame (hereinafter collectively referred to as frame) is received at a port that is designated to execute client authentication, the packet/frame forwarding unit 3050 judges whether the received frame is a frame sent from the client 400 that has successfully been authenticated.

Judging that the received frame has been sent from the successfully authenticated client 400, the packet/frame forwarding unit 3050 relays the frame sent from this client 400.

Judging that the received frame has been sent from the client 400 that has unsuccessfully been authenticated, the packet/frame forwarding unit 3050 does not relay the frame sent from this client 400.

The memory 3020 stores a neighbour information management program 3060, a client authentication management program 3070, a configuration management program 3080, neighbour information 3090, an authentication configuration 3100, and the configuration 3110.

The neighbour information management program 3060 generated the neighbour information 3090. The neighbour information management program 3060 also sends the neighbour information 3090 to the management server 100 periodically. Instead of sending the neighbour information 3090 to the management server 100 periodically, the neighbour information management program 3060 may send the neighbour information 3090 to the management server 100 each time a change is made to the neighbour information 3090.

The client authentication management program 3070 converts connection requests received from the clients 400 into messages according to a protocol that is employed between the authentication server 200 and the switch 300, and sends the converted connection requests to the authentication server 200. The client authentication management program 3070 generates or updates the authentication configuration 3100 in response to an authentication result received from the authentication server 200.

The configuration management program 3080 stores, in the memory 3020, as the configuration 3110, the configuration 1150 received from the management server 100. The configuration management program 3080 sets settings information of the configuration 3110 in the packet/frame forwarding unit 3050.

The neighbour information 3090 shows whether or not client authentication is performed on a connected switch, which is connected directly to a port provided in the switch 300. Specifically, registered in the neighbour information 3090 are an identifier uniquely assigned to the connected switch, a number assigned to the port to which the connected switch is connected, and information indicating whether or not the connected switch has a client authentication function.

Registered in the authentication configuration 3100 is at which port provided in the switch 300 client authentication is executed. Specifically, a port number, which is an identifier assigned to each port provided in the switch 300, and information about whether or not client authentication is executed at the port identified by the port number are registered in the authentication configuration 3100. The configuration 3110 is settings information of the switch 300.

Figure 4:
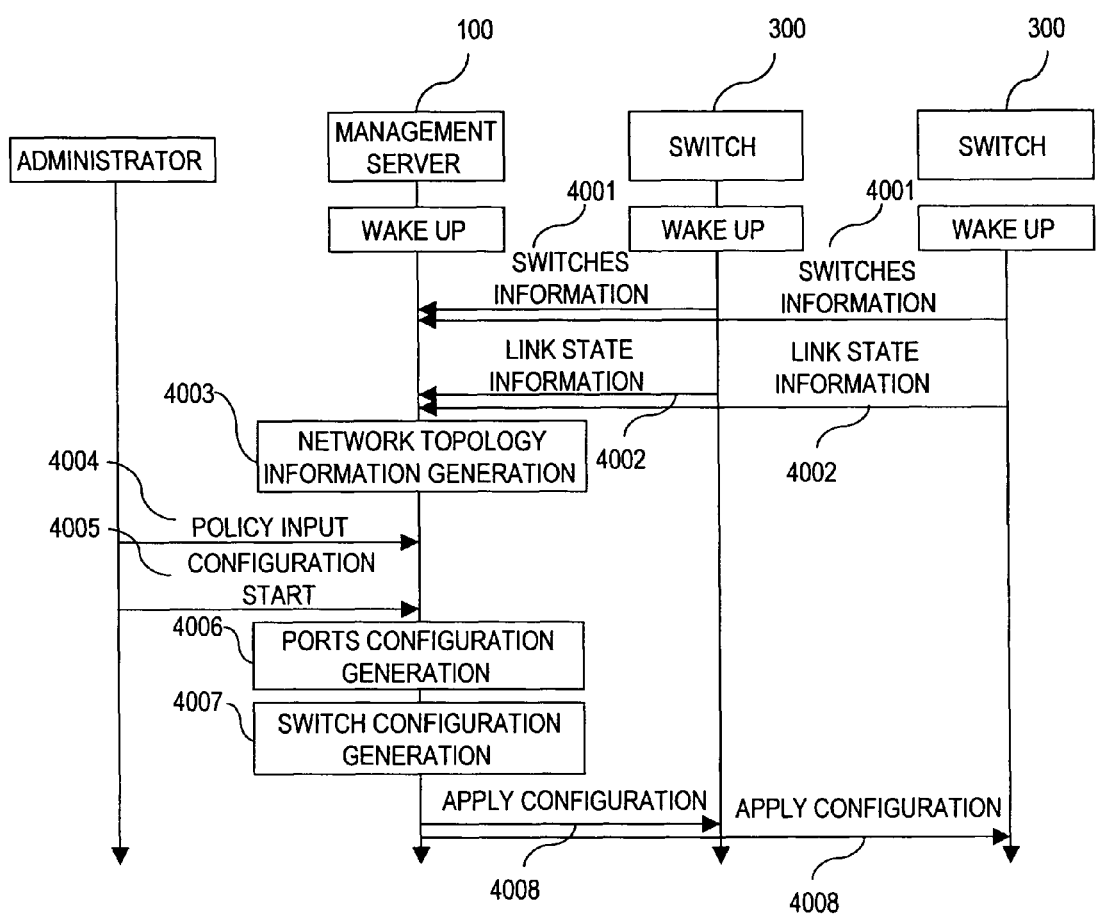
FIG. 4 is a sequence diagram of the management server and the switch according to the first embodiment of this invention.

FIG. 4 is a sequence diagram of the management server 100 and the switch 300 according to the first embodiment of this invention.

Referring to FIG. 4, a description will be given on a case of newly building a network with a client authentication function, or a case of newly introducing client authentication into an existing network.

The switch 300 is activated to send switches information and link state information 500 to the management server 100 (4001 and 4002). The switches information shows whether or not the switch 300 is capable of executing client authentication. Specifically, the switches information contains an identifier uniquely assigned to the switch 300 and information about whether or not client authentication is executable. The link state information 500 indicates the connection relation between one switch 300 and another. Details of the link state information 500 will be described with reference to FIG. 5.

The management server 100 receives the switches information and the link state information 500, and generates the network topology information 1110 based on the link state information 500 (4003).

Specifically, an identifier unique to the switch 300 that is contained in the link state information 500 is registered in a switch 11101 contained in the network topology information 1110, a port identifier that is contained in the link state information 500 is registered in a port 11102 contained in the network topology information 1110, and an identifier unique to a connected switch that is contained in the link state information 500 is registered in a connected switch 11103 contained in the network topology information 1110.

The management server 100 stores the received switches information in the memory 1020 as the switches information 1120.

After the network topology information 1110 is generated, the administrator inputs the configuration policy 1130 in the management server 100 (4004), and instructs the management server 100 to start setting the ports configuration information 1140 (4005). The management server 100 generates the ports configuration information 1140 based on the network topology information 1110 and the configuration policy 1130 (4006).

The management server 100 then generates the configuration 1150 stored in the management server 100 based on the ports configuration information 1140 (4007). The management server 100 sends the generated configuration 1150 to the switch 300 whose configuration 3110 needs to be changed, and applies the generated configuration 1150 to the configuration 3110 that is stored in the switch 300 (4008).

Figure 5:
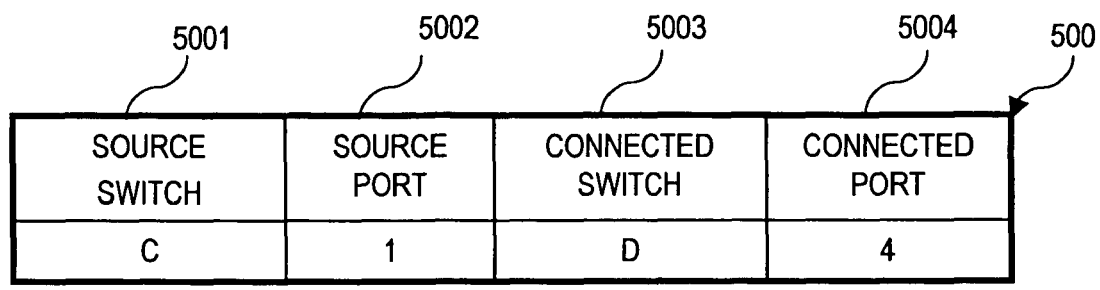
FIG. 5 is a diagram showing link state information according to the first embodiment of this invention.

FIG. 5 is a diagram showing the link state information 500 according to the first embodiment of this invention.

The link state information 500 contains a source switch 5001, a source port 5002, a connected switch 5003, and a connected port 5004.

Registered as the source switch 5001 is the identifier of the switch 300 that sends the link state information 500 to the management server 100. As the source port 5002, the identifier of a port provided in the switch 300 that sends the link state information 500 to the management server 100 is registered. Registered as the connected switch 5003 is the identifier of a connected switch that is connected directly to a port which is one of ports provided in the switch 300 that sends the link state information 500 to the management server 100, and which is indicated by the source port 5002.

Registered as the connected switch 5003 is the identifier of a connected switch that is connected directly to a port which is indicated by the source port 5002. Registered as the connected port 5004 is the identifier of a port that is one of ports provided in the switch 300 indicated by the connected switch 5003 and connected directly to a port indicated by the source port 5002.

Figure 6:
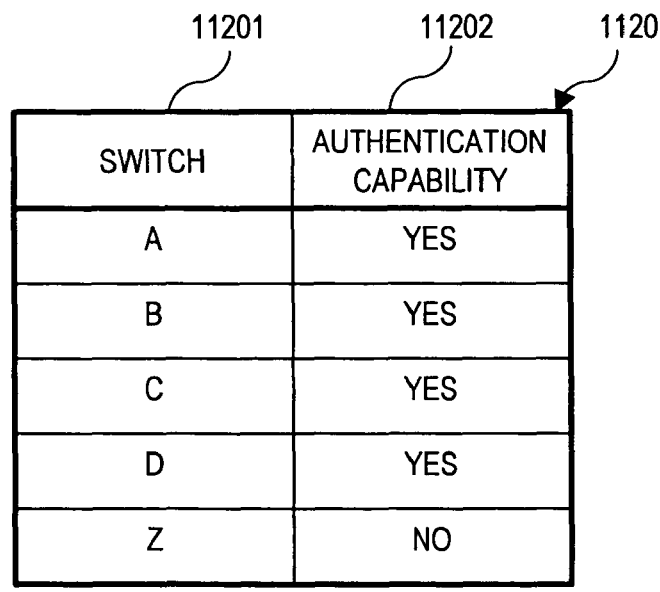
FIG. 6 is a diagram showing switches information according to the first embodiment of this invention.

FIG. 6 is a diagram showing the switches information 1120 according to the first embodiment of this invention.

The switches information 1120 contains a switch 11201 and an authentication capability 11202. As the switch 11201, an identifier unique to each switch 300 in the network is registered.

Registered as the authentication capability 11202 is information about whether the individual switches 300 can execute client authentication. Specifically, the switch 300 for which "yes" is registered as the authentication capability 11202 can execute client authentication, whereas the switch 300 for which "no" is registered as the authentication capability 11202 cannot execute client authentication.

FIG. 7 is a diagram showing the network topology information 1110 according to the first embodiment of this invention.

The network topology information 1110 is generated based on the link state information 500. The network topology information 1110 contains the switch 11101, the port 11102, and the connected switch 11103.

Registered as the switch 11101 is an identifier unique to each switch 300 in the network. As the port 11102, the identifier of a port that is connected directly to a connected switch is registered. As the connected switch 11103, an identifier unique to a connected switch that is connected directly to a port is registered.

While the identifier of a port that is connected directly to a connected switch alone is registered as the port 11102 in the network topology information 1110 shown in FIG. 7, the identifier of every port provided in each switch 300 may be registered as the port 11102 instead. In this case, an identifier indicating the absence of a connected switch is registered as the connected switch 11103 in an entry for a port to which no connected switch is directly connected.

Specifically, the switch 300 having a port to which no connected switch is directly connected sends, to the management server 100, the link state information 500 that indicates the absence of a connected switch. In the link state information 500 that indicates the absence of a connected switch, NULL, for example, is registered as the connected switch 5003 and as the connected port 5004.

The management server 100 receives this link state information 500 and registers, as the connected switch 11103 in a corresponding entry of the network topology information 1110, the identifier indicating the absence of a connected switch (e.g., NULL).

A port to which no connected switch is directly connected is, for example, a disabled port or a port that is connected to the client 400.

FIG. 8 is a diagram showing the ports configuration information 1140 that is associated with the switch 300D according to the first embodiment of this invention.

The ports configuration information 1140 shows whether client authentication is executed at ports provided in each switch 300. The ports configuration information 1140 contains a port number 11401 and authentication 11402. The port number 11401 indicates the identifier of a port provided in the switch 300. Registered as the authentication 11402 is information about whether or not client authentication is executed in a port identified by the port number 11401.

Referring to FIGS. 1 and 7, the clients 400 are connected to a port 1 and a port 2 that are in the switch 300D whereas nothing is connected to a port 3 that is in the switch 300D. To a port 4 that is in the switch 300D, the switch 300C is directly connected.

The ports configuration information 1140 is therefore set such that, of the ports 1 to 4 provided in the switch 300D, the port 1, the port 2, and the port 3 to which no connected switch is directly connected and the clients 400 can be connected execute client authentication.

The above description deals with a case in which the ports configuration information 1140 is registered for each switch 300. The switch-basis ports configuration information 1140 may be replaced by single ports configuration information 1140. The single ports configuration information 1140 contains an identifier unique to each switch 300 in the network.

Figure 9:
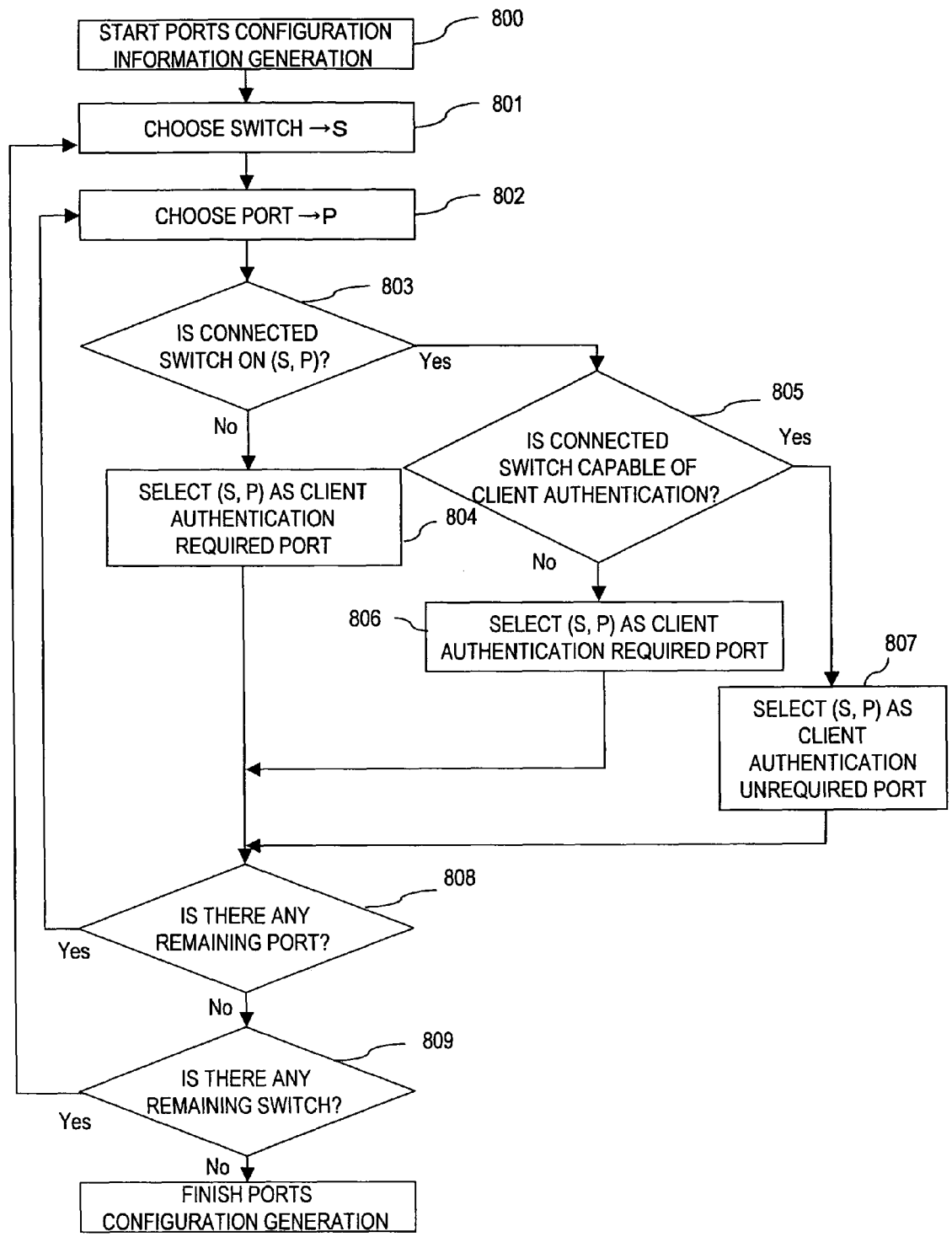
FIG. 9 is a flow chart for ports configuration generating processing according to the first embodiment of this invention.

FIG. 9 is a flow chart for ports configuration generating processing according to the first embodiment of this invention.

First, the management server 100 chooses, from the network topology information 1110, one switch identifier S registered as the switch 11101 (801). The management server 100 next chooses one port identifier P from among port identifiers registered as the port 11102 in the network topology information 1110 (802). The chosen port identifier P is the identifier of a port provided in the switch 300 that is indicated by the switch identifier S chosen in Step 801.

Using the switch identifier S and the port identifier P that have been chosen in Step 801 and Step 802, respectively, the management server 100 searches the network topology information 1110 and judges whether or not a connected switch is connected to the port that is identified by the chosen port identifier P (803).

When it is judged in Step 803 that a connected switch is connected to the port that is identified by the chosen port identifier P, the management server 100 proceeds to Step 805.

When it is judged in Step 803 that no connected switch is connected to the port that is identified by the chosen port identifier P, the management server 100 registers "yes" as the authentication 11402 in an entry of the ports configuration information 1140 that is associated with the switch 300 that is identified by the switch identifier S chosen in Step 801 (804). This entry has, as the port number 11401, the port identifier P chosen in Step 802. The management server 100 then proceeds to Step 808.

After judging that a connected switch that is connected to the port identified by the chosen port identifier P is found in Step 803, the management server 100 obtains, from the network topology information 1110, a connected switch identifier registered as the connected switch 11103 in an entry whose switch 11101 and port 11102 match the chosen switch identifier S and the chosen port identifier P. The management server 100 judges whether or not a connected switch that is identified by the obtained connected switch identifier can execute the client authentication function (805).

Specifically, the management server 100 judges whether or not "yes" is registered as the authentication capability 11202 in an entry of the switches information 1120 whose switch 11201 matches the obtained connected switch identifier.

When it is judged in Step 805 that the connected switch cannot execute the client authentication function, the management server 100 registers "yes" as the authentication 11402 in an entry of the ports configuration information 1140 that is associated with the switch 300 that is identified by the chosen switch identifier S (806). This entry has, as the port number 11401, the chosen port identifier P. The management server 100 then moves to Step 808.

When it is judged in Step 805 that the connected switch can execute the client authentication function, the management server 100 registers "no" as the authentication 11402 in an entry of the ports configuration information 1140 that is associated with the switch 300 that is identified by the chosen switch identifier S (807). This entry has, as the port number 11401, the chosen port identifier P. The management server 100 then proceeds to Step 808.

In Step 808, the management server 100 judges whether or not any one of the ports provided in the chosen switch 300 remains unprocessed by the processing of Step 803 to Step 807.

When it is judged that all of the ports provided in the switch 300 that is identified by the chosen switch identifier S have executed the processing of Step 803 to Step 807, the management server 100 proceeds to Step 809.

When it is judged that not all of the ports provided in the switch 300 that is identified by the chosen switch identifier S have executed the processing of Step 803 to Step 807, the management server 100 returns to Step 802.

In Step 809, the management server 100 judges whether or not any one of the switches 300 remains unprocessed by the processing of Step 802 to Step 808.

When it is judged that all of the switches 300 have executed the processing of Step 802 to Step 808, the management server 100 ends the processing of generating the ports configuration information 1140.

When it is judged that not all of the switches 300 have executed the processing of Step 802 to Step 808, the management server 100 returns to Step 801.

The management server 100 can thus automatically set the ports configuration information 1140 in a network constituted of multiple switches 300 capable of client authentication such that client authentication is executed at a port provided in a switch at the lower end of the network.

This cuts the workload of an administrator which is required in enabling a client authentication function, and prevents wrong settings and skipped settings due to human factor.

Second Embodiment

Described next with reference to FIGS. 10 to 17A and 17B is processing in which the management server 100 automatically sets the ports configuration information 1140 in response to an addition of a new switch to existing switches in the network.

Figure 10:
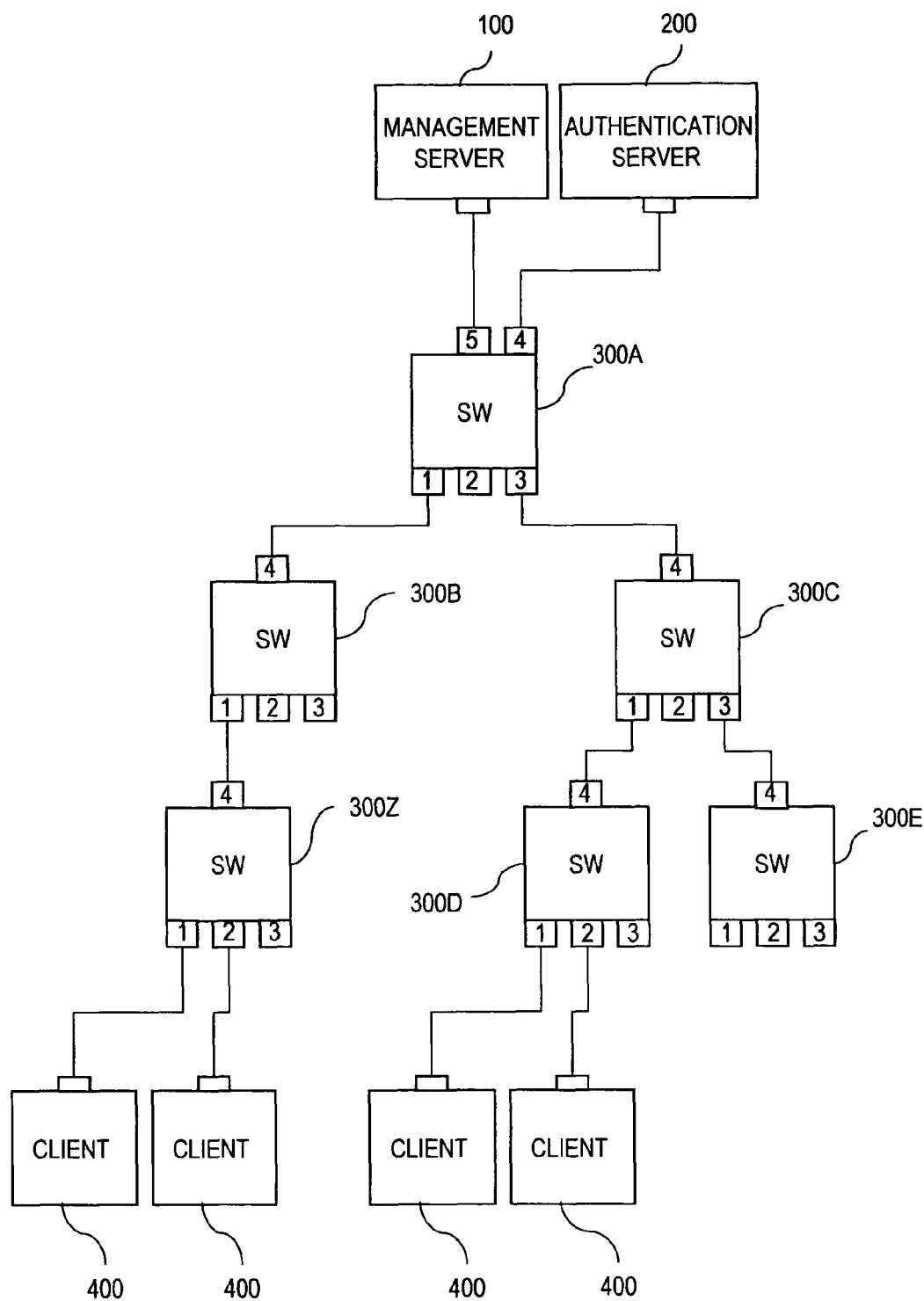
FIG. 10 is a diagram showing a configuration of the network operation management system according to a second embodiment of this invention.

FIG. 10 is a diagram showing a configuration of a network operation management system according to a second embodiment of this invention. In the second embodiment, components common to the first embodiment are denoted by the same reference symbols, and descriptions thereof will be omitted.

The network operation management system shown in FIG. 10 is obtained by adding a new switch 300E to the network operation management system shown in FIG. 1. Specifically, a port 4 of the switch 300E is newly connected to a port 3 of the switch 300C. The switch 300C will be referred to as existing switch 300C and the switch 300E will be referred to as new switch 300E.

The management server 100 detects the addition of the new switch 300E to the network and then newly sets the ports configuration information 1140 that is associated with the new switch 300E. The management server 100 also edits the settings in the ports configuration information 1140 that is associated with the existing switch 300C to which the new switch 300E is connected.

Based on the ports configuration information 1140 set by the management server 100, the new switch 300E executes client authentication at its ports excluding the port 4, which is connected to the existing switch 300C, namely, ports 1 to 3 to which the clients 400 can be connected. A port to which the client(s) 400 can be connected is a port to which no connected switch is connected.

Figure 11:
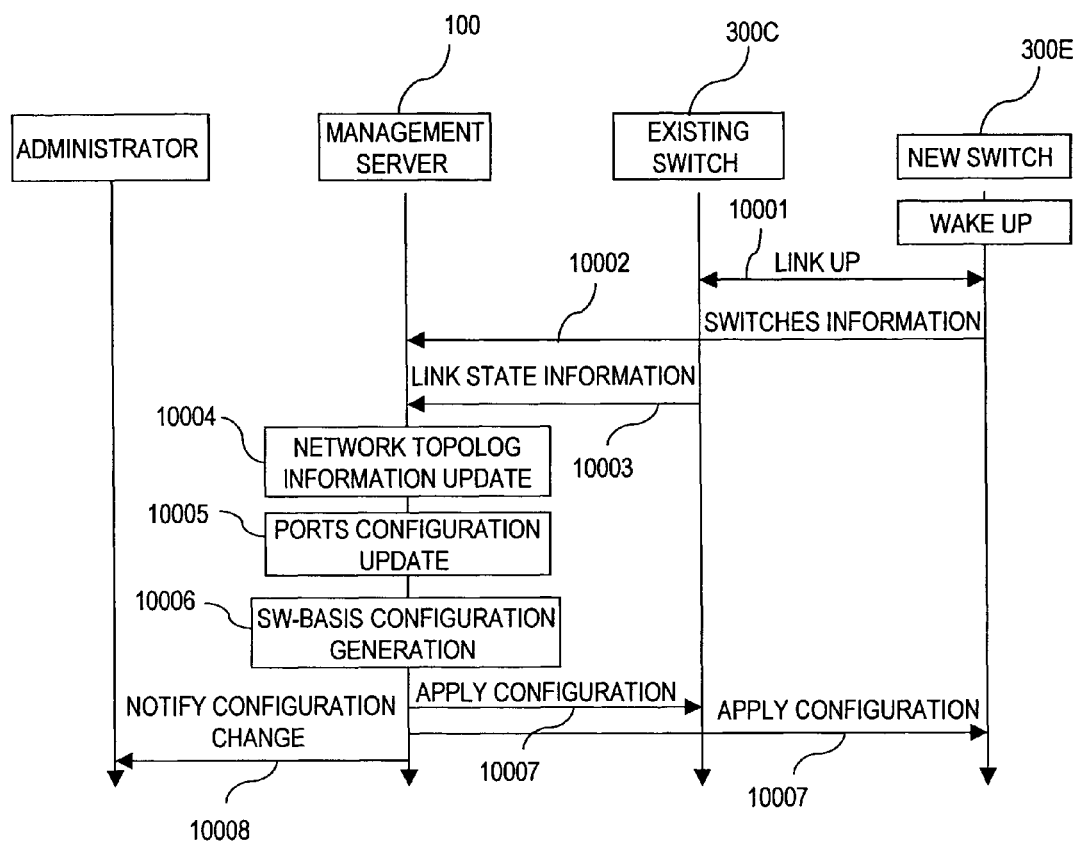
FIG. 11 is a sequence diagram of the management server, the existing switch, and the new switch according to the second embodiment of this invention.

FIG. 11 is a sequence diagram of the management server 100, the existing switch 300C, and the new switch 300E according to the second embodiment of this invention.

When the new switch 300E is activated, a data link is established between one port provided in the new switch 300E and connected to the existing port 300C, and one port provided in the existing switch 300C and connected to the new switch 300E (10001). The new switch 300E establishes the data link with the use of, for example, various measures for establishing data link, which is defined by IEEE 802.3.

Establishing the data link with the existing switch 300C, the new switch 300E sends switches information to the management server 100 (10002). The switches information contains an identifier unique to the new switch 300E and an identifier that indicates whether or not the new switch 300E can execute client authentication. The switches information in this case contains the identifier of every port provided in the new switch 300E.

The existing switch 300C sends the link state information 500 to the management server 100 after the data link with the new switch 300E is established (10003).

An identifier unique to the existing switch 300C is registered as the source switch 5001 in the link state information 500. Registered as the source port 5002 in the link state information 500 is the identifier one port provided in the existing switch 300C and connected directly to the new switch 300E.

Registered as the connected switch 5003 is an identifier unique to the new switch 300E, which is newly connected directly to a port that is indicated by the source port 5002. Registered as the connected port 5004 is the identifier of a port that is one of the ports provided in the new switch 300E indicated by the connected switch 5004 and connected directly to a port indicated by the source port 5002.

The management server 100 receives the link state information 500 sent from the existing switch 300C and the switches information sent from the new switch 300E, and updates the network topology information 1110 based on the received link state information 500 (10004).

The management server 100 updates the ports configuration information 1140 that is associated with the existing switch 300C and the ports configuration information 1140 that is associated with the new switch 300E based on the link state information 500 sent from the existing switch 300C (10005).

The management server 100 generates the configurations 1150 of the existing switch 300C and the new switch 300E based on the updated ports configuration information 1140 (10006). The management server 100 applies the generated configurations 1150 to the configurations 3110 stored in the existing switch 300C and the new switch 300E (10007).

According to the configuration 1150 generated by the management server 100, the existing switch 300C sets its ports such that client authentication is not executed at a port that is connected to the new switch 300E. The new switch 300E sets its ports such that client authentication is executed at ports that are not connected to the existing switch 300C and that can be connected to the clients 400, according to the configuration 1150 generated by the management server 100.

The management server 100 may notify an administrator of the changes in settings of the ports configuration information 1140 that is associated with the existing switch 300C and the ports configuration information 1140 that is associated with the new switch 300E, and other similar settings changes (10008).

Specifically, the management server 100 generates a new window on a graphical user interface (GUI) to notify the administrator of a change in settings of the ports configuration information 1140 or the like. The management server 100 may also notify the administrator of a change in settings of the ports configuration information 1140 or the like by writing the change in a log file.

Another way that can be employed by the management server 100 to notify the administrator of a change in settings of the ports configuration information 1140 or the like is to send a simple network management protocol (SNMP) trap to an SNMP manager disposed in the network. Sending a message to a Syslog server is still another way that can be employed by the management server 100 to notify the administrator of a change in settings of the ports configuration information 1140 or the like.

Figure 12:
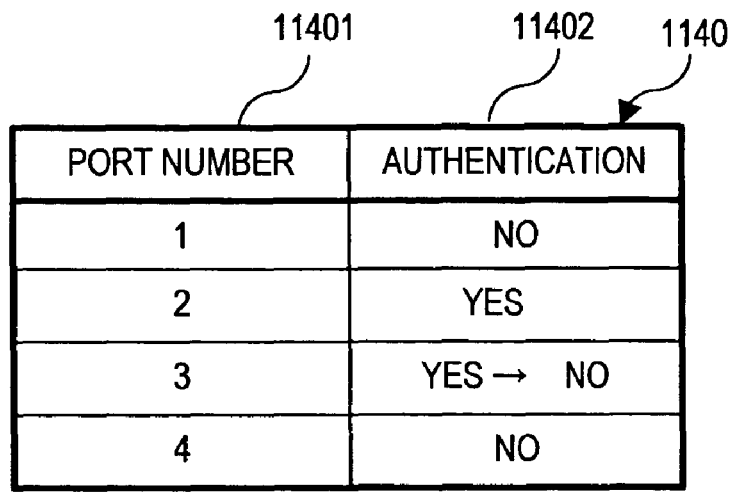
FIG. 12 is a diagram showing a change that occurs in the ports configuration information associated with the switch as a result of the addition of the new switch according to the second embodiment of this invention.

FIG. 12 is a diagram showing a change that occurs in the ports configuration information 1140 associated with the switch 300C as a result of the addition of the new switch 300E according to the second embodiment of this invention.

Before the new switch 300E is connected to the existing switch 300C, "yes" is registered as the authentication 11402 in entries of the ports configuration information 1140 that is associated with the existing switch 300C. These entries have, as the port number 11401, the identifiers of the port 2 and the port 3 to which no connected switch is connected.

In other words, client authentication is executed at the port 2 and the port 3 provided in the existing switch 300C before the new switch 300E is connected to the existing switch 300C. Further, before the new switch 300E is connected to the existing switch 300C, "no" is registered as the authentication 11402 in entries of the ports configuration information 1140 that is associated with the existing switch 300C. These entries have, as the port number 11401, the identifiers of the port 1 and the port 4 which can be connected to the clients 400.

In other words, client authentication is not executed at the port 1 and the port 4 provided in the existing switch 300C before the new switch 300E is connected to the existing switch 300C.

The new switch 300E is connected to the port 3 provided in the existing switch 300C. Therefore, after the new switch 300E is connected to the existing switch 300C, the authentication 11402 is changed from "yes" to "no" in an entry of the ports configuration information 1140 associated with the existing switch 300C. The entry has the identifier of the port 3 as the port number 11401.

Figure 13:
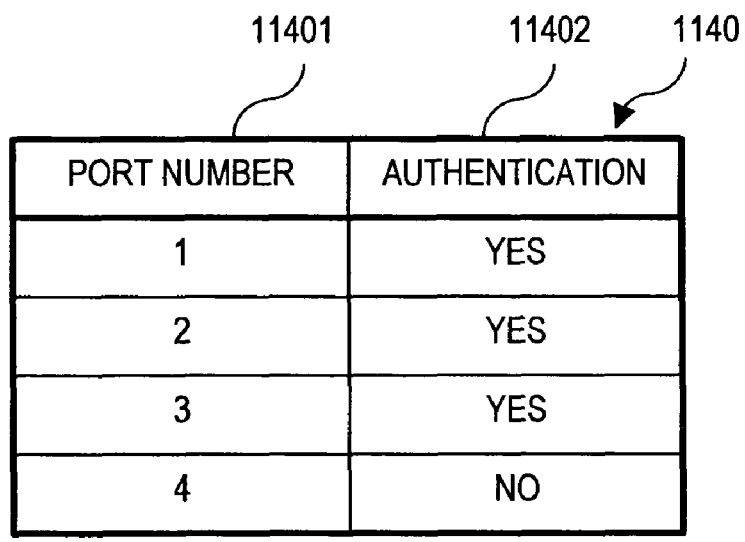
FIG. 13 is a diagram showing the ports configuration information that is associated with the new switch according to the second embodiment of this invention.

FIG. 13 is a diagram showing the ports configuration information 1140 that is associated with the new switch 300E according to the second embodiment of this invention.

The management server 100 receives the switches information sent from the new switch 300E and then generates the ports configuration information 1140 that is associated with the new switch 300E. At this point, nothing is registered in each entry of the ports configuration information 1140 that is associated with the new switch 300E.

Upon receiving the link state information 500 from the existing switch 300C, the management server 100 registers "no" as the authentication 11402 for the port 4, which is connected to the existing switch 300C, and "yes" as the authentication 11402 for the port 1, the port 2, and the port 3, which can be connected to the clients 400. In other words, client authentication is executed at the port 1, the port 2, and the port 3 provided in the new switch 300E whereas client authentication is not executed at the port 4 provided in the new switch 300E.

The management server 100 thus updates, in a network that is newly built by connecting the new switch 300E to the existing switch 300C, the ports configuration information 1140 that is associated with the existing switch 300C and the ports configuration information 1140 that is associated with the new switch 300E such that client authentication is executed at ports that can be connected to the clients 400.

Figure 14:
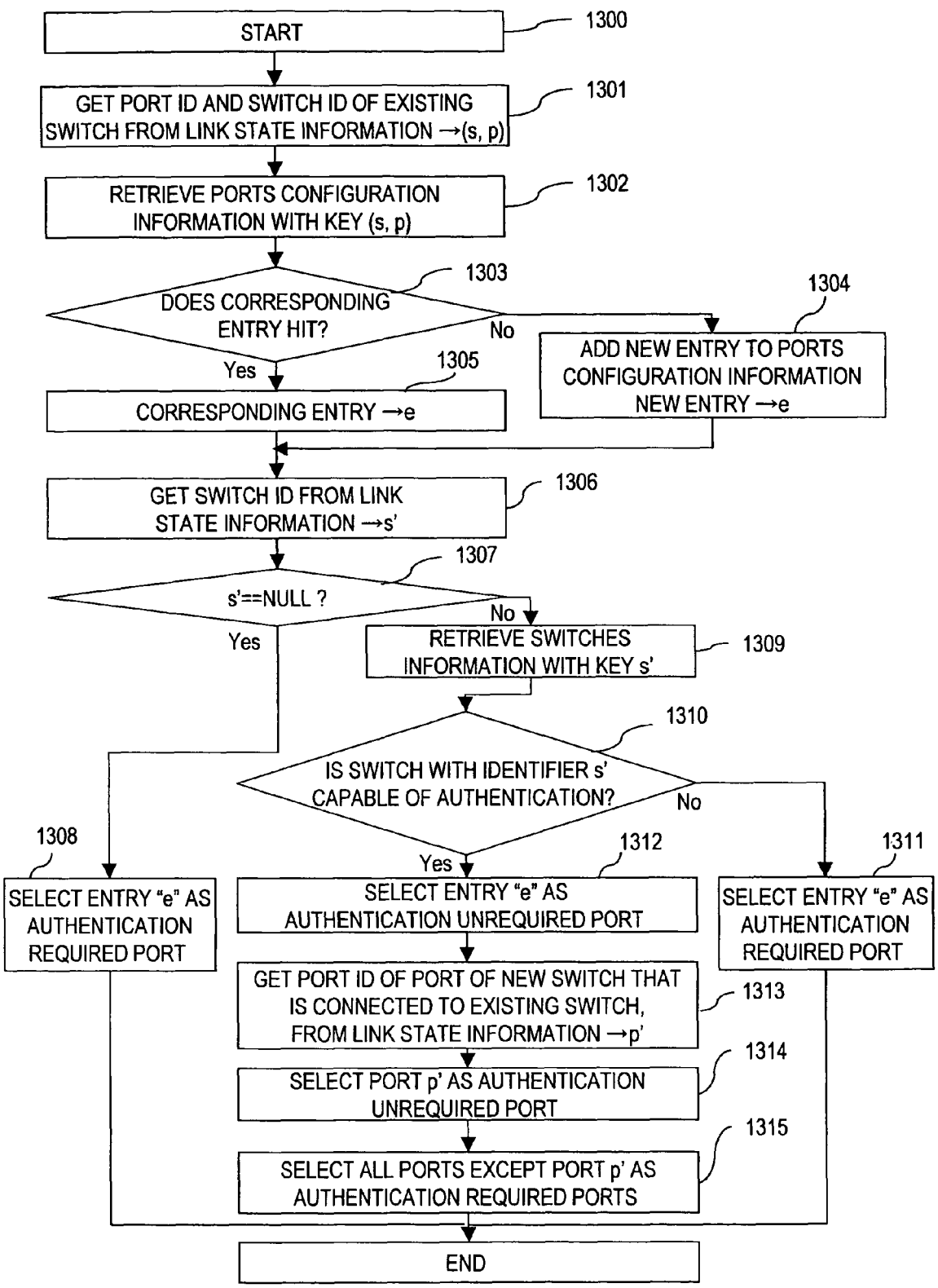
FIG. 14 is a flow chart for ports configuration generating processing according to the second embodiment of this invention.

FIG. 14 is a flow chart for ports configuration generating processing according to the second embodiment of this invention.

The management server 100 executes the ports configuration generation program 1090 and starts processing of creating the ports configuration information 1140 upon receiving from the existing switch 300C the link state information 500 that indicates that the new switch 300E has just been connected to the existing switch 300C (1300).

The ports configuration generation program 1090 extracts, from the received link state information 500, a switch identifier s registered as the source switch 5001 and a port identifier p registered as the source port 5002 (1301).

Using the combination of the switch identifier s and the port identifier p which have been extracted in Step 1301, the ports configuration generation program 1090 retrieves the ports configuration information 1140 that is associated with the extracted switch identifier s (1302).

The ports configuration generation program 1090 judges whether or not the ports configuration information 1140 that is associated with the extracted switch identifier s has an entry for the extracted port identifier p (1303).

When it is judged in Step 1303 that an entry for the extracted port identifier p is not in the ports configuration information 1140 that is associated with the extracted switch identifier s, in other words, the ports configuration information 1140 that is associated with the existing switch 300C, the ports configuration generation program 1090 generates a new entry in the ports configuration information 1140 that is associated with the existing switch 300C, which is identified by the extracted switch identifier s, and registers the extracted port identifier p as the port number 11402 in the new entry.

The ports configuration generation program 1090 then extracts a pointer e of the registered new entry (1304), and proceeds to Step 1306.

When an entry for the extracted port identifier p is found in the ports configuration information 1140 that is associated with the existing switch 300C, the ports configuration generation program 1090 extracts the pointer e of the found entry (1305). The ports configuration generation program 1090 then proceeds to Step 1306.

In Step 1306, the ports configuration generation program 1090 extracts, from the link state information 500 received from the existing switch 300C, a switch identifier s' registered as the connected switch 5003.

The ports configuration generation program 1090 judges whether or not a value of the switch identifier s' extracted in Step 1306 is NULL (1307). In other words, the ports configuration generation program 1090 judges in Step 1307 whether or not the switch 300 that has been connected to a port provided in the switch 300 that has sent the link state information 500 is now disconnected from the port.

In the case where the new switch 300E is newly connected to the existing switch 300C, an identifier unique to the new switch 300E is registered as the connected switch 5003. Accordingly, the identifier unique to the new switch 300E is extracted as the connected switch 5003 in Step 1306, and it is judged in Step 1307 that the value of the extracted switch identifier s' is not NULL.

On the other hand, in the case where a switch 300 is disconnected from the existing switch 300C, NULL is registered as the connected switch 5003 as shown in FIG. 16. Accordingly, NULL is extracted as the connected switch 5003 in Step 1306, and it is judged in Step 1307 that the value of the extracted switch identifier s' is NULL.

When it is judged in Step 1307 that the value of the extracted switch identifier s' is NULL, the ports configuration generation program 1090 registers "yes" as the authentication 11402 in an entry of the ports configuration information 1140 that is indicated by the pointer e extracted in Step 1304 or Step 1305 (1308). The ports configuration generation program 1090 then ends the ports configuration generating processing.

In other words, judging that one switch 300 has been disconnected from a port provided in another switch 300, the ports configuration generation program 1090 sets the ports configuration information 1140 such that client authentication is executed at the port from which the switch 300 has been disconnected. Details of Step 1308 will be described with reference to FIG. 15.

When it is judged in Step 1307 that the value of the extracted switch identifier s' is not NULL, the ports configuration generation program 1090 searches the switches information 1120 using the extracted switch identifier s' (1309).

The ports configuration generation program 1090 refers to the switches information 1120 to judge whether or not the new switch 300E identified by the switch identifier s' is a switch that can execute client authentication (1310).

Specifically, the ports configuration generation program 1090 judges whether or not "yes" is registered as the authentication capability 11202 in an entry of the switches information 1120 that has the switch identifier s' as the switch 11201.

When it is judged in Step 1307 that the new switch 300E cannot execute client authentication, the ports configuration generation program 1090 registers "yes" as the authentication 11402 in an entry of the ports configuration information 1140 that is indicated by the pointer e extracted in Step 1304 or Step 1305 (1311).

The ports configuration information 1140 is thus set such that client authentication is executed at one port provided in the existing switch 300C and connected to the new switch 300E.

When it is judged in Step 1307 that the new switch 300E can execute client authentication, on the other hand, the ports configuration generation program 1090 registers "no" as the authentication 11402 in an entry of the ports configuration information 1140 that is indicated by the pointer e extracted in Step 1304 or Step 1305 (1312).

The ports configuration generation program 1090 thus sets the ports configuration information 1140 such that client authentication is not executed at one port provided in the existing switch 300C and connected to the new switch 300E.

Thereafter, the ports configuration generation program 1090 extracts, from the link state information 500 received from the existing switch 300C, a port identifier p' registered as the connected port 5004 (1313).

The ports configuration generation program 1090 sets the ports configuration information 1140 such that client authentication is not executed at the port that is identified by the extracted port identifier p' (1314).

Specifically, the ports configuration generation program 1090 registers "no" as the authentication 11402 in an entry of the ports configuration information 1140 that is associated with the switch identifier s'. This entry has, as the port number 11401, the extracted port identifier p'.

The ports configuration information 1140 is thus set such that client authentication is not executed at one port provided in the new switch 300E and connected to the existing switch 300C.

The ports configuration generation program 1090 also sets the ports configuration information 1140 such that client authentication is executed at other ports provided in the switch 300 that is identified by the switch identifier s' than the one that is identified by the port identifier p' (1315), and then ends the ports configuration generating processing.

Specifically, the ports configuration generation program 1090 registers "yes" as the authentication 11402 in entries of the ports configuration information 1140 that is associated with the switch identifier s'. These entries exclude an entry that has the port identifier p' as the port number 11401.

The ports configuration information 1140 is thus set such that client authentication is executed at ports which are provided in the new switch 300E and which can be connected to the clients 400.

After the ports configuration generating processing is ended, the management server 100 generates the configuration 1150 based on the set ports configuration information 1140.

The configuration generating/applying program 1100 stored in the management server 100 writes, in the configuration 1150 for the existing switch 300C and the configuration 1150 for the new switch 300E, for each port provided in the existing switch 300C and the new switch 300E, information about whether client execution is executed at the port, based on values registered as the authentication 11402 in the ports configuration information 1140 that is associated with the existing switch 300C and the ports configuration information 1140 that is associated with the new switch 300E.

The configuration generating/applying program 1100 also writes an identifier unique to the authentication server 200 in the configuration 1150 for the existing switch 300C and the configuration 1150 for the new switch 300E. The configuration generating/applying program 1100 then sends the configuration 1150 for the existing switch 300C to the existing switch 300C and the configuration 1150 for the new switch 300E to the new switch 300E, respectively, and applies the configuration 1150 for the existing switch 300C to the configuration 3110 of the existing switch 300C and the configuration 1150 for the new switch 300E to the configuration 3110 of the new switch 300E, respectively.

The management server 100 uses a command line interface which is provided in each switch 300 in applying, through a TELNET protocol, the configuration 1150 to the configuration 3110 stored in the switch 300.

Other than the method that uses the TELNET protocol and the command line interface provided in each switch 300, the management server 100 may apply the configuration 1150 to the configuration 3110 stored in the switch 300 by a method that uses the configuration SNMP in manipulating settings of a management information base (MIB), or a method that uses a NETCONF protocol in sending a data model of the configuration 1150 to the switch 300.

A case of removing one switch 300 from the network of the network operation management system will be described next. In the following description, the switch 300 that is removed from the network will be referred to as removed switch 300D and the switch 300 that has been connected to the removed switch 300D will be referred to as existing switch 300C.

The premise here is that, before the removed switch 300D is disconnected from the existing switch 300C, client authentication has been executed at ports 1 to 3 provided in the removed switch 300D which are not connected to the existing switch 300C. In this case, after the removed switch 300D is disconnected from the existing switch 300C, the security of the network is degraded unless client authentication is executed at the port 1 provided in the existing switch 300C which has been connected to the removed switch 300D. It is therefore necessary to change the ports configuration information 1140 such that client authentication is executed at the port 1 provided in the existing switch 300C which has been connected to the removed switch 300D.

Figure 15:
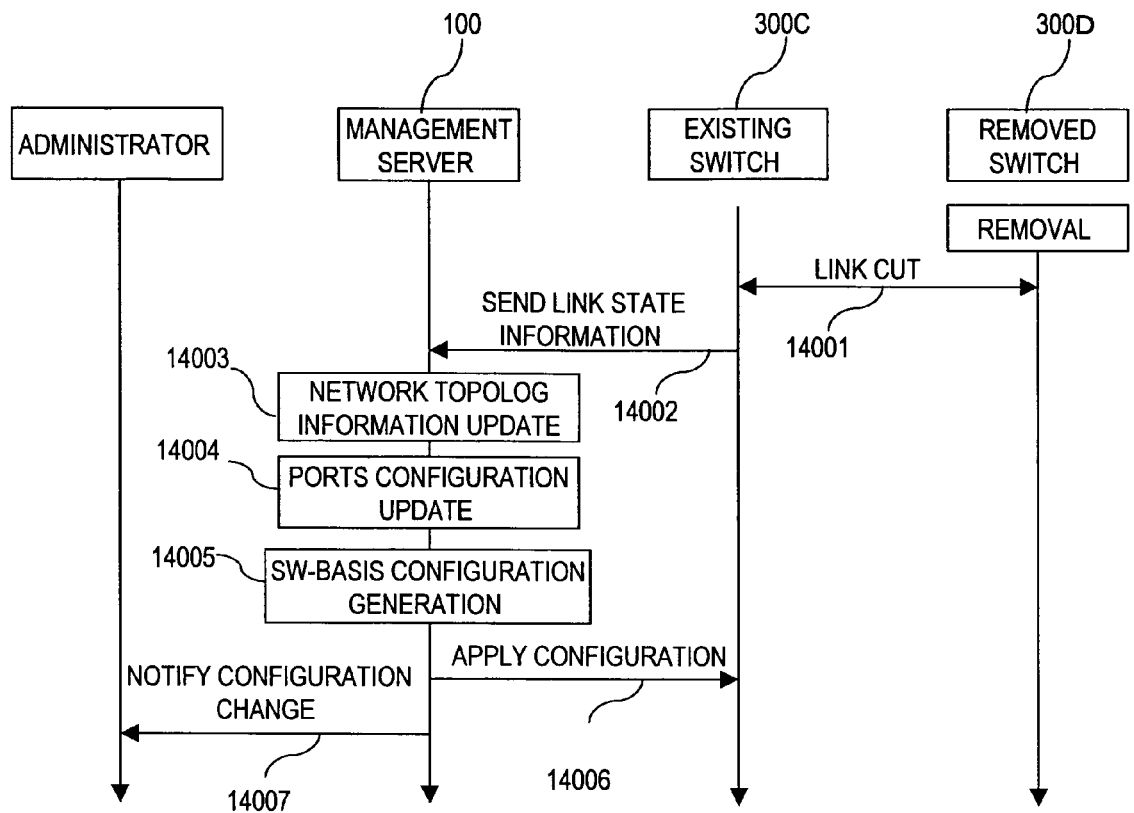
FIG. 15 is a sequence diagram of the management server and the switch from which another switch is disconnected according to the second embodiment of this invention.

FIG. 15 is a sequence diagram of the management server 100 and the switch 300 from which another switch 300 is disconnected according to the second embodiment of this invention.

When the removed switch 300D is disconnected from the existing switch 300C, the existing switch 300 which has been connected to the removed switch 300D detects that the link between the removed switch 300D and the existing switch 300C has been broken (14001).

The existing switch 300C then sends, to the management server 100, the link state information 500 that indicates the removal of the removed switch 300D (14002). This link state information 500 contains, as shown in FIG. 16, the source switch 5001, the source port 5002, the connected switch 5003, and the connected port 5004.

NULL is registered as the connected switch 5003 since no switch 300 is connected to the port 1 provided in the existing switch 300C. As the connected port 5004, NULL is registered since no port provided in the removed switch 300D is connected to the existing switch 300C.

The management server 100 receives the link state information 500 sent from the existing switch 300C, and updates the network topology information 1110 based on the received link state information 500 (14003).

The management server 100 updates the ports configuration information 1140 by executing the ports configuration generating processing shown in FIG. 14 (14004). Based on the updated ports configuration information 1140, the management server 100 generates the configuration 1150 for the existing switch 300C (14005).

The management server 100 sends the generated configuration 1150 to the existing switch 300C, and applies the configuration 1150 to the configuration 3110 stored in the existing switch 300C (14006). In the case where there is a change in the generated configuration 1150, the management server 100 may notify the administrator of the change in the configuration 1150 (14007).

Ports configuration generating processing that is executed when a switch is removed from the network will be described next with reference to FIG. 14.

Since NULL is registered as the connected switch 15003 in the link state information 500 that the management server 100 has received from the existing switch 300C, the ports configuration generation program 1090 judges in Step 1307 that the value of the switch identifier s' extracted in Step 1306 is NULL, and proceeds to Step 1308.

In Step 1308, the ports configuration generation program 1090 registers "yes" as the authentication 11402 in an entry of the ports configuration information 1140 that is indicated by the pointer e extracted in Step 1304 or Step 1305.

The ports configuration information 1140 is thus set such that client authentication is executed at the port 1 which has been connected to the removed switch 300D out of the ports provided in the existing switch 300C from which the link state information 500 has been sent.

The management server 100 updates the configuration 1150 for the existing switch 300C based on the set ports configuration information 1140. The management server 100 sends the updated configuration 1150 to the existing switch 300C, and applies this configuration 1150 to the configuration 3110 stored in the existing switch 300C.

The existing switch 300C executes client authentication at its port 1 according to the configuration 3110 to which the configuration 1150 sent from the management server 100 is applied.

In the manner described above, the network can be set such that client authentication is executed at every port that can be connected to the client(s) 400 both before and after removal of a switch from the network in operation. This prevents the client 400 that does not have the right to connect to the network from accessing the network, thereby ensuring the security of the network.

When an event occurs in the network, for example, when a new switch 300 is added or when one of the switches 300 is removed, the existing switch 300 may send, to the management server 100, link state information 1700A or 1700B which contains an event type indicating what event has occurred in the network as shown in FIGS. 17A and 17B.

FIG. 17A is a diagram showing the link state information 1700A according to the second embodiment of this invention.

The link state information 1700A is sent to the management server 100 by the existing switch 300C when the new switch 300E is connected to the existing switch 300C.

The link state information 1700A contains an event type 1701, a source switch 1702, a source port 1703, a connected switch 1704, and a connected port 1705. The source switch 1702, the source port 1703, the connected switch 1704, and the connected port 1705 correspond to the source switch 5001, the source port 5002, the connected switch 5003, and the connected port 5004, respectively.

The event type 1701 indicates what event has occurred at a port provided in the existing switch 300C that is registered as the source port 1702. Specifically, "addition" or "removal" is registered as the event type 1701. In the case where a new switch is added, "addition" is registered as the event type 1701 whereas "removal" is registered as the event type 1701 when a switch is removed from the network. "Addition" is registered as the event type 1701 that is contained in the link state information 1700A.

FIG. 17B is a diagram showing the link state information 1700B according to the second embodiment of this invention.

The link state information 1700B is sent to the management server 100 by the existing switch 300C when the new switch 300E is disconnected from the existing switch 300C.

The link state information 1700B contains the event type 1701, the source switch 1702, and the source port 1703. "Removal" is registered as the event type 1701 in the link state information 1700B since the new switch 300E is disconnected from the existing switch 300C.

A description will be given on ports configuration generating processing that is executed when the existing switch 300C sends the link state information 1700A or 1700B, focusing on steps different from those in the ports configuration generating processing of FIG. 14.

In Step 1306, the ports configuration generation program 1090 extracts from the link state information 1700A or 1700B a value registered as the event type 1701.

In Step 1307, the ports configuration generation program 1090 judges whether the value extracted in Step 1306 is "addition" or "removal".

When it is judged in Step 1307 that "addition" is registered as the event type 1701, the ports configuration generation program 1090 proceeds to Step 1309. The ports configuration generation program 1090 proceeds to Step 1308 when it is judged in Step 1307 that "removal" is registered as the event type 1701.

Third Embodiment

Multiple virtual networks can be built within a company network by defining multiple virtual LANs (VLANs) to each switch 300 constituting the company network.

Generally speaking, in the case where the switches 300 to which the same multiple VLANs are defined are connected to one another, a TAG VLAN function is enabled at ports of these switches 300 that interconnect the switches 300.

At a port where the TAG VLAN function is enabled, an identifier of a VLAN that is allocated to this port is given to a frame. Also, a port where the TAG VLAN function is enabled sends and receives only frames that have the identifier of the allocated VLAN. Multiple virtual data links are thus constructed in a single connection between the switches 300.

Figure 18:
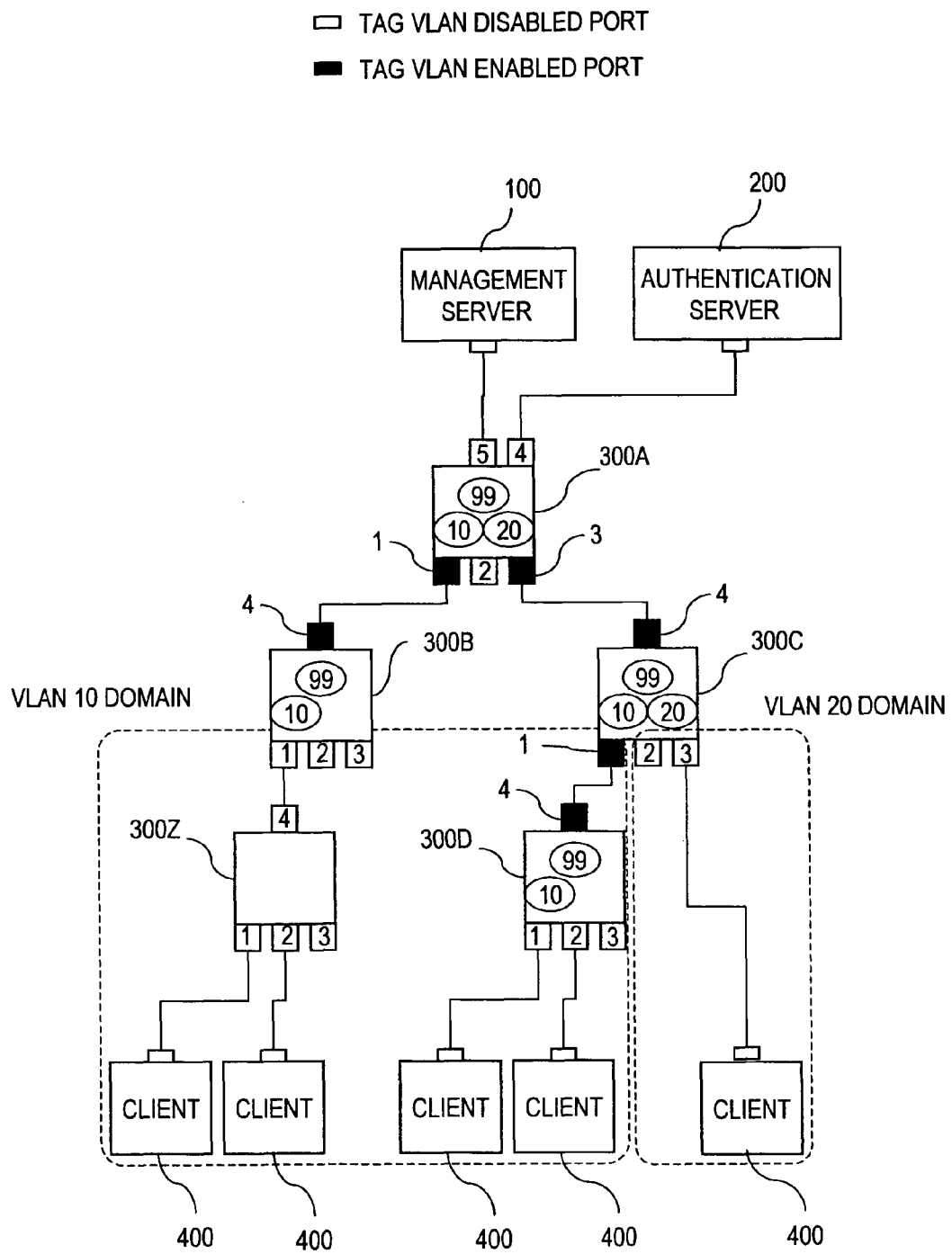
FIG. 18 is a diagram showing a configuration of the network operation management system according to a third embodiment of this invention.

FIG. 18 is a diagram showing a configuration of a network operation management system according to a third embodiment of this invention.

A VLAN 10, a VLAN 20, and a VLAN 99 are defined to a switch 300A and a switch 300C. The VLAN 10 and the VLAN 99 are defined to a switch 300B and a switch 300D. The VLAN 99 is a VLAN through which the management server 100 and the authentication server 200 communicate with the clients 400 and the switches 300.

The TAG VLAN function is enabled at ports provided in the switches 300A to 300D and connected the switches 300A to 300D.

A switch 300Z is a switch that does not have the TAG VLAN function. Therefore, the TAG VLAN function is not used between the switch 300B and the switch 300Z.

The clients 400 that belong to the VLAN 10 are connected to ports 1 to 3 provided in the switch 300Z and ports 1 to 3 provided in the switch 300D. The client 400 that belongs to the VLAN 20 is connected to a port 3 provided in the switch 300C.

The memory 1020 in the management server 100 of this embodiment stores a whole VLAN definition takeover flag and VLAN definition information.

Registered in the VLAN definition information that is stored in the management server 100, are VLAN identifiers defined to the respective switches 300.

As the whole VLAN definition takeover flag, information is registered that indicates whether or not a new switch 300 connected to an existing switch 300 takes over all of VLAN identifiers that are defined to the existing switch 300. Whether to activate the whole VLAN definition takeover flag may be set by an administrator.

The memory 3020 in each switch 300 stores VLAN definition information. Registered in the VLAN definition information that is stored in each switch 300 are VLAN identifiers that are defined to the switch 300.

Figure 19:
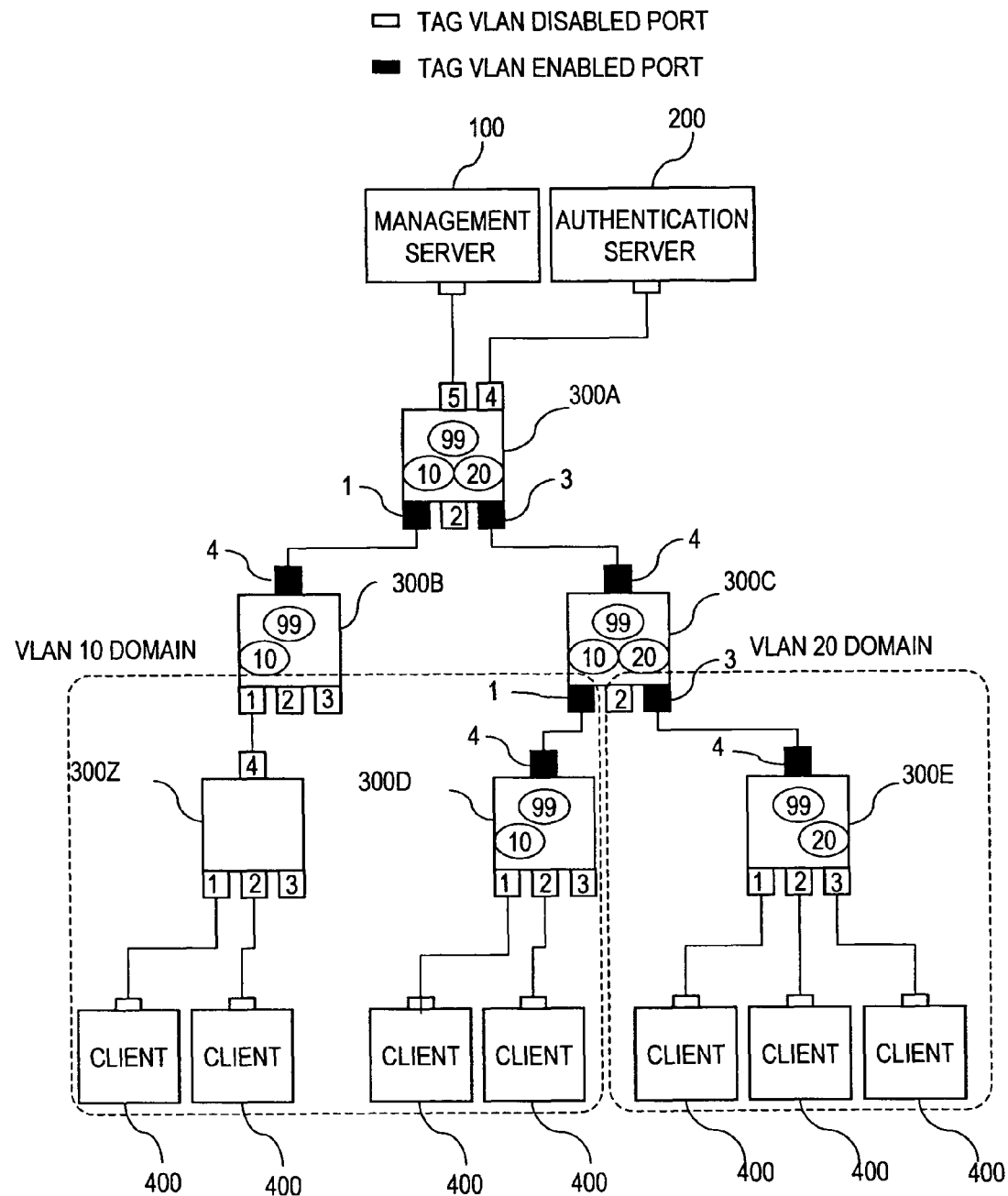
FIG. 19 is a diagram showing the configuration of a network operation management system that is obtained by adding a new switch to the network operation management system that is shown in FIG. 18 according to the third embodiment of this invention.

FIG. 19 is a diagram showing the configuration of a network operation management system that is obtained by adding a new switch 300E to the network operation management system that is shown in FIG. 18 according to the third embodiment of this invention.

The VLAN 20 and the VLAN 99 are defined in advance to the new switch 300E. Specifically, the identifier of the VLAN 20 and the identifier of the VLAN 99 are registered in VLAN definition information that is stored in the new switch 300E.

The clients 400 that belong to the VLAN 20 can be connected to the new switch 300E. Accordingly, more clients 400 belong to the VLAN 20 after the new switch 300E is added than before the new switch 300E is added.

As shown in FIG. 19, a port 4 provided in the new switch 300E is connected to the port 3 provided in the switch 300C, and the clients 400 that belong to the VLAN 20 are connected to ports 1 to 3 provided in the new switch 300E.

The TAG VLAN function connects the switch 300C and the new switch 300E to each other. The port 3 provided in the switch 300C and the port 4 provided in the new switch 300E communicate frames that have the identifier of the VLAN 20 or the VLAN 99.

Processing of selecting which port executes client authentication according to this embodiment is the same as the ports configuration generating processing that is executed by the management server 100 according to the second embodiment, and the description will not be repeated. This embodiment only describes differences from the first embodiment and the second embodiment.

In this embodiment, when the new switch 300E is added to the network, the management server 100 sets the ports configuration information 1140 that is associated with the existing switch 300C and the ports configuration information 1140 that is associated with the new switch 300E. The management server 100 sets the ports configuration information 1140 such that the TAG VLAN function is enabled at the port 3 provided in the existing switch 300C to allow frames that have the identifier of the VLAN 20 or the VLAN 99 to be transmitted and received.

The management server 100 also registers the identifiers of the VLAN 20 and the VLAN 99 in the VLAN definition information 3120 for the new switch 300E.

The management server 100 then sets the ports configuration information 1140 such that the TAG VLAN function is enabled at the port 4 provided in the new switch 300E to allow frames that have the identifier of the VLAN 20 or the VLAN 99 to be transmitted and received.

Figure 20:
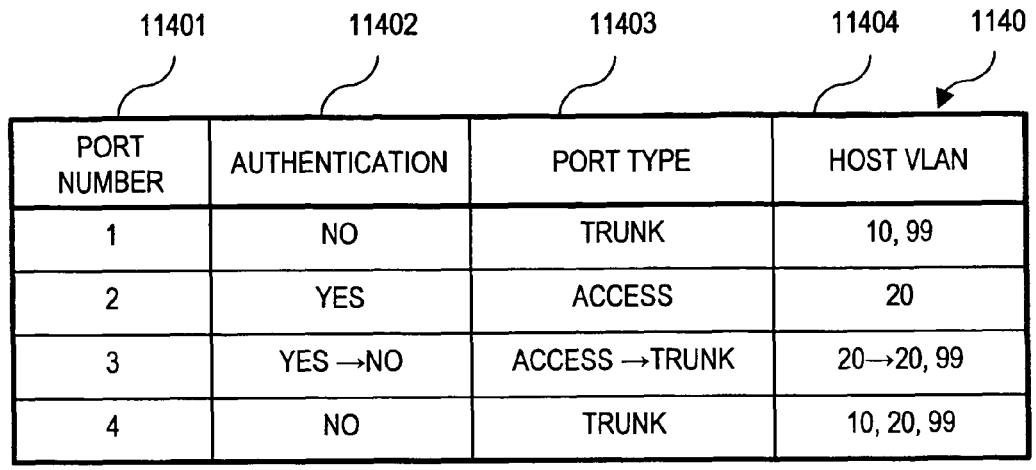
FIG. 20 is a diagram showing a change caused in the ports configuration information that is associated with the switch by an addition of the new switch according to the third embodiment of this invention.

FIG. 20 is a diagram showing a change caused in the ports configuration information 1140 that is associated with the switch 300C by an addition of the new switch 300E according to the third embodiment of this invention.

The ports configuration information 1140 that is associated with any switch 300 that has the TAG VLAN function contains the port number 11401, the authentication 11402, a port type 11403, and a host VLAN 11404. The port number 11401 and the authentication 11402 of FIG. 20 are the same as the port number 11401 and the authentication 11402 that are contained in the ports configuration information 1140 shown in FIGS. 8 and 12, and their descriptions will be omitted.

The port type 11403 indicates the operation state of a port provided in the switch 300. Specifically, "access" or "trunk" is registered as the port type 11403. "Access" indicates that the TAG VLAN function is disabled at the port, which means that the port belongs to a single VLAN. "Trunk" indicates that the TAG VLAN function is enabled at the port, which means that a VLAN identifier is given to frames that are sent and received by the port. The frames sent and received by the port belong to a VLAN that is identified by the VLAN identifier given to the frames.

In the ports configuration information 1140 that is associated with the existing switch 300C, the authentication 11402 is set such that client authentication is not executed in the port 3 which is one of the ports present in the existing switch 300C after the addition of the new switch 300E and to which the new switch 300E is directly connected. The port type 11403 in the ports configuration information 1140 that is associated with the existing switch 300C is set such that the TAG VLAN function is enabled at the port 3 provided in the existing switch 300C to which the new switch 300E is directly connected.

Specifically, the authentication 11402 is changed from "yes" to "no" in an entry of the ports configuration information 1140 associated with the existing switch 300C that has the identifier of the port 3 as the port number 11401. The port type 11403 is changed from "access" to "trunk" in the entry of the ports configuration information 1140 associated with the existing switch 300C that has the identifier of the port 3 as the port number 11401.

In entries of the ports configuration information 1140 associated with the existing switch 300C that have the identifiers of the port 1 and the port 4 as the port number 11401, "no" is registered as the authentication 11402 and "trunk" is registered as the port type 11403. In an entry of this ports configuration information 1140 for the port 2, "yes" is registered as the authentication 11402 and "access" is registered as the port type 11403.

Figure 21:
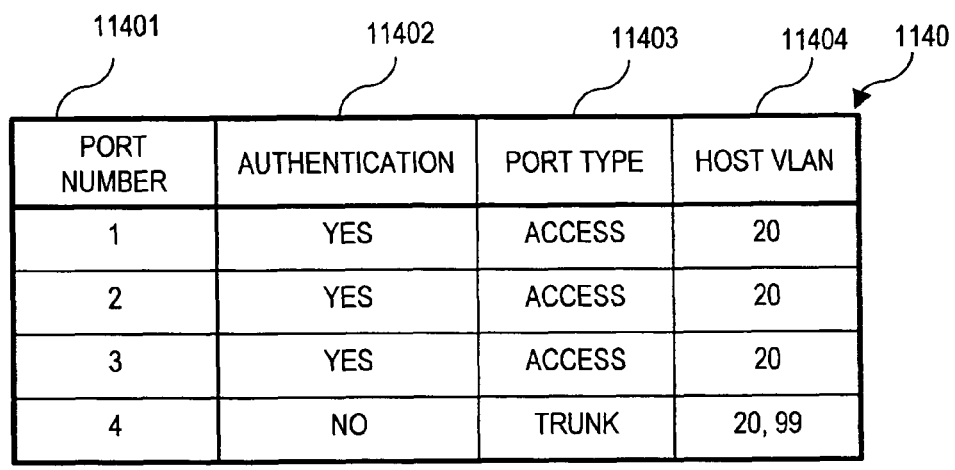
FIG. 21 is a diagram showing the ports configuration information that is associated with the new switch according to the third embodiment of this invention.

FIG. 21 is a diagram showing the ports configuration information 1140 that is associated with the new switch 300E according to the third embodiment of this invention.

When the new switch 300E is connected to the switch 300C, the ports configuration information 1140 that is associated with the new switch 300E is set such that client authentication is not executed at the port 4 provided in the new switch 300E which is connected directly to the switch 300C.

The ports configuration information 1140 that is associated with the new switch 300E is also set such that the TAG VLAN function is enabled at the port 4 provided in the new switch 300E which is connected directly to the switch 300C.

The ports configuration information 1140 that is associated with the new switch 300E is also set such that client authentication is executed at the ports 1 to 3 provided in the new switch 300E which can be connected to the clients 400. The ports configuration information 1140 that is associated with the new switch 300E is also set such that the TAG VLAN function is disabled at the ports 1 to 3 provided in the new switch 300E which can be connected to the clients 400.

Specifically, "no" is registered as the authentication 11402 and "trunk" is registered as the port type 11403 in an entry of the ports configuration information 1140 associated with the new switch 300E that has the identifier of the port 4 as the port number 11401.

"Yes" is registered as the authentication 11402 and "access" is registered as the port type 11403 in entries of the ports configuration information 1140 associated with the new switch 300E that have the identifiers of the ports 1 to 3 as the port number 11401.

Figure 22:
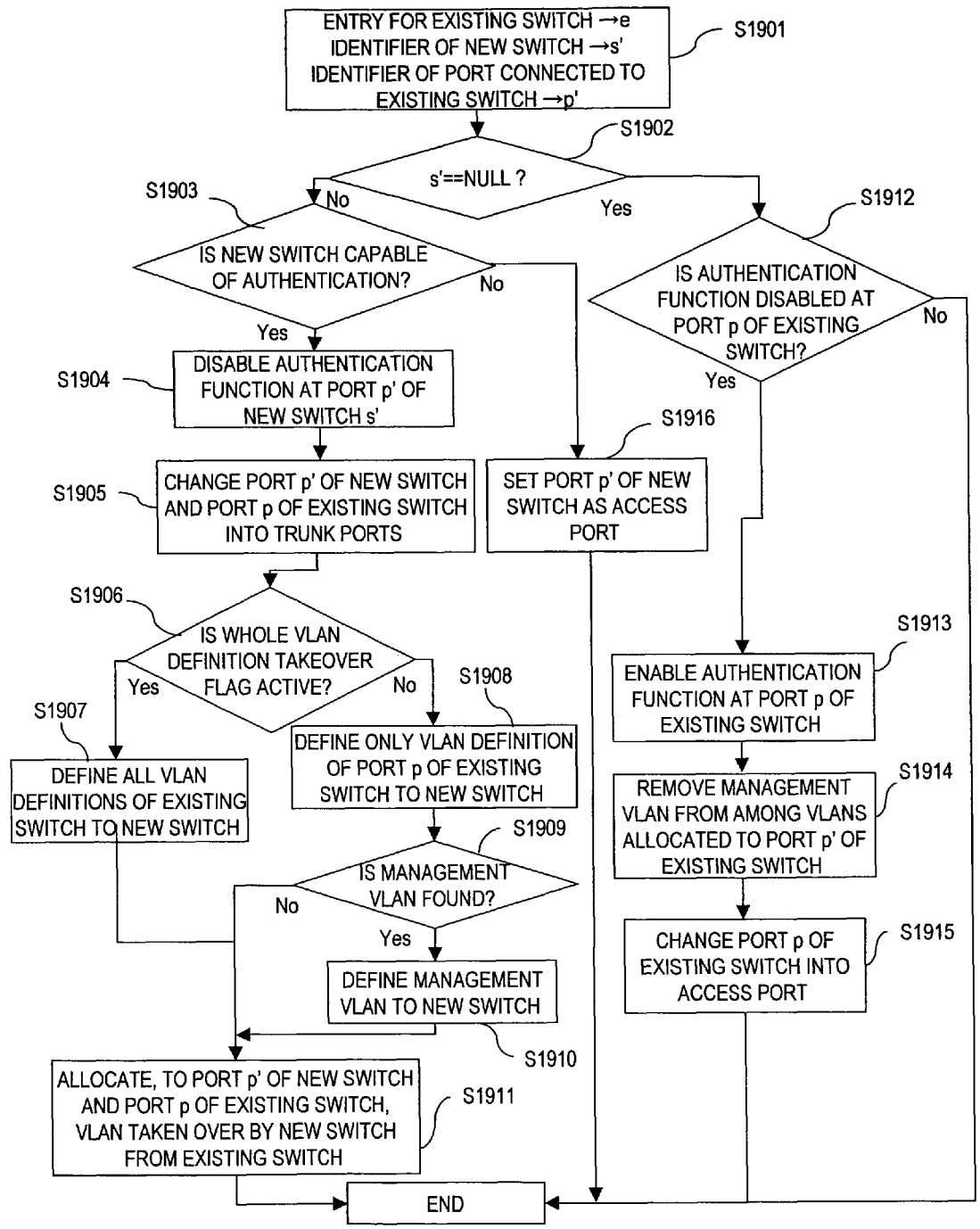
FIG. 22 is a flow chart for ports configuration generating processing according to the third embodiment of this invention.

FIG. 22 is a flow chart for ports configuration generating processing according to the third embodiment of this invention.

The management server 100 receives from the existing switch 300C the link state information 500 that indicates that the existing switch 300C is connected to the new switch 300E, and then executes the ports configuration generation program 1090 to execute Steps 1301 to 1307 of the ports configuration generating processing shown in FIG. 14 (1901).

The ports configuration generation program 1090 extracts, from the ports configuration information 1140 that is associated with the existing switch 300C, a pointer e for a port identifier p of a port that is connected directly to the new switch 300E.

The ports configuration generation program 1090 also extracts, from the received link state information 500, a switch identifier s' registered as the connected switch 5003 and a port identifier p' registered as the connected port 5004.

As in Step 1307, the ports configuration generation program 1090 judges whether or not a value of the switch identifier s' extracted in Step 1901 is NULL (1902).

When it is judged in Step 1902 that the value of the extracted switch identifier s' is not NULL, the ports configuration generation program 1090 refers to the switches information 1120 to judge whether or not the switch 300 that is identified by the extracted switch identifier s' can execute the client authentication function (1903). In the network operation management system shown in FIG. 19, the management server 100 judges whether or not the new switch 300E can execute client authentication.

When it is judged in Step 1903 that the switch 300 that is identified by the extracted switch identifier s' cannot execute the client authentication function, the ports configuration information 1140 is set such that the TAG VLAN function is disabled at the port that is identified by the extracted port identifier p' (1916), and then the ports configuration generating processing is ended.

Specifically, "access" is registered as the port type 1403 in an entry of the ports configuration information 1140 that is associated with the switch 300 that is identified by the extracted switch identifier s'. This entry has the extracted port identifier p' as the port number 11401.

When it is judged in Step 1903 that the switch 300 that is identified by the extracted switch identifier s' can execute the client authentication function, the ports configuration generation program 1090 sets the ports configuration information 1140 such that client authentication is not executed at the port that is identified by the extracted port identifier p' (1904).

Specifically, the ports configuration generation program 1090 registers "no" as the authentication 1142 in an entry of the ports configuration information 1140 that is associated with the switch 300 that is identified by the extracted switch identifier s'. This entry has the extracted port identifier p' as the port number 11401.

In Step 1904, the ports configuration generation program 1090 registers "no" as the authentication 1142 in entries of the ports configuration information 1140 that is associated with the switch 300 that is identified by the extracted switch identifier s'. These entries exclude an entry that has the extracted port identifier p' as the port number 11401.

The ports configuration generation program 1090 then sets the ports configuration information 1140 such that the TAG VLAN function is enabled at the port that is identified by the extracted port identifier p' and a port that is identified by the extracted port identifier p (1905).

"Trunk" is registered as the port type 1403 in an entry of the ports configuration information 1140 that is associated with the switch 300 that is identified by the extracted switch identifier s'. This entry has the extracted port identifier p' as the port number 11401. Similarly, "trunk" is registered as the port type 1403 in an entry of the ports configuration information 1140 that is associated with the switch 300 that is identified by the extracted switch identifier s. This entry has the extracted port identifier p as the port number 11401.

The ports configuration generation program 1090 registers "access" as the port type 1403 in entries of the ports configuration information 1140 that is associated with the switch 300 that is identified by the extracted switch identifier s'. These entries exclude an entry that has the extracted port identifier p' as the port number 11401.

In the network operation management system shown in FIG. 19, the port 4 provided in the new switch 300E which is connected to the existing switch 300C is set as a trunk port, and the port 1 provided in the existing switch 300C which is connected to the new switch 300E is set as a trunk port.

The ports configuration generation program 1090 next judges whether the whole VLAN definition takeover flag stored in the management server 100 is active or not (1906).

When it is judged in Step 1906 that the whole VLAN definition takeover flag is active, the ports configuration generation program 1090 defines VLANs that have been defined to the existing switch 300C to the new switch 300E (1907), and proceeds to Step 1911.

Specifically, the ports configuration generation program 1090 searches the VLAN definition information that is stored in the management server 100 for VLAN definition information for the existing switch 300C and registers, in VLAN definition information for the new switch 300E, all of VLAN identifiers registered in the VLAN definition information for the existing switch 300C.

When it is judged in Step 1906 that the whole VLAN definition takeover flag is not active, the ports configuration generation program 1090 defines, to the new switch 300E, a VLAN allocated to one of the ports provided in the existing switch 300C that is connected to the new switch 300E (1908).

Specifically, the ports configuration generation program 1090 obtains, from the ports configuration information 1140 that is associated with the existing switch 300C, all of VLAN identifiers registered as the host VLAN 11404 in an entry that has the extracted port identifier p as the port number 11401. The ports configuration generation program 1090 registers the obtained VLAN identifiers in the VLAN definition information for the new switch 300E.

The ports configuration generation program 1090 then judges whether or not a management VLAN identifier (the identifier of the VLAN 99) is found in the VLAN definition information for the existing switch 300C among the VLAN definition information that is stored in the management server 100 (1909).

When it is judged in Step 1909 that the management VLAN identifier (the identifier of the VLAN 99) is not found in the VLAN definition information for the existing switch 300C among the VLAN definition information that is stored in the management server 100, the ports configuration generation program 1090 proceeds to Step 1911.

When it is judged that the management VLAN identifier (the identifier of the VLAN 99) is found in the VLAN definition information for the existing switch 300C among the VLAN definition information that is stored in the management server 100, the ports configuration generation program 1090 defines the management VLAN (the VLAN 99) to the new switch 300E (1910), and proceeds to Step 1911.

Specifically, the ports configuration generation program 1090 registers the management VLAN identifier (the identifier of the VLAN 99) in the VLAN definition information for the new switch 300E among the VLAN definition information that is stored in the management server 100.

The ports configuration generation program 1090 allocates the VLANs that are newly defined to the new switch 300E to the ports that are identified by the extracted port identifiers p' and p (1911), and then ends the ports configuration generating processing.

Specifically, the ports configuration generation program 1090 searches the VLAN definition information that is stored in the management server 100 for the VLAN definition information for the switch 300 that is identified by the extracted switch identifier s', and obtains VLAN identifiers registered in the VLAN definition information for the switch 300 that is identified by the extracted switch identifier s'. The ports configuration generation program 1090 registers the obtained VLAN identifiers as the host VLAN 11404 in an entry of the ports configuration information 1140 that is associated with the switch 300 that is identified by the extracted switch identifier s'. This entry has the extracted port identifier p' as the port number 11401.

The ports configuration generation program 1090 also registers the obtained VLAN identifiers as the host VLAN 11404 in an entry of the ports configuration information 1140 that is associated with the switch 300 that is identified by the extracted switch identifier s. This entry has the extracted port identifier p as the port number 11401.

Described next is ports configuration generating processing that is executed when a switch is removed from the network. The description here deals with a case of disconnecting the switch 300D from the switch 300C in the network operation management system of FIG. 19. The switch 300C will be referred to as existing switch 300C and the switch 300D will be referred to as removed switch 300D.

When it is judged in Step 1902 that the value of the extracted switch identifier s' is NULL, in other words, when it is judged that the removed switch 300D has been removed, the ports configuration generation program 1090 judges whether or not the client authentication function is disabled at the port that is identified by the extracted port identifier p (1912). The port identified by the port identifier p is, in this case, one of the ports provided in the existing switch 300C to which the removed switch 300D has been connected.

Specifically, the ports configuration generation program 1090 judges whether or not "no" is registered as the authentication 11402 in an entry that has the extracted port identifier p as the port number 11401 in the ports configuration information 1140 that is associated with the switch 300 that is identified by the extracted switch identifier s.

When it is judged in Step 1904 that the client authentication function is enabled at the port that is identified by the extracted port identifier p, the ports configuration generation program 1090 ends the ports configuration generating processing.

When it is judged in Step 1904 that the client authentication function is disabled at the port that is identified by the extracted port identifier p, the ports configuration generation program 1090 sets the ports configuration information 1140 such that client authentication is executed at the port that is identified by the extracted port identifier p (1913).

Specifically, the ports configuration generation program 1090 changes the authentication 11402 from "no" to "yes" in an entry that has the extracted port identifier p as the port number 11401 in the ports configuration information 1140 that is associated with the switch 300 that is identified by the extracted switch identifier s.

In this way, client authentication is executed at one of the ports provided in the existing switch 300C that has been connected to the removed switch 300D.

The ports configuration generation program 1090 then removes the management VLAN (the VLAN 99) from among VLANs allocated to the port that is identified by the extracted port identifier p (1914).

Specifically, the ports configuration generation program 1090 deletes, from the host VLAN 11404 of the ports configuration information 1140 that is associated with the switch 300 that is identified by the extracted switch identifier s, the management VLAN identifier (the identifier of the VLAN 99) as the host VLAN 11404 of an entry that has the extracted port identifier p as the port number 11401.

The port which is provided in the existing switch 300C and which has been connected to the removed switch 300D is a port to which the client(s) 400 can be connected. Since the management VLAN is removed in Step 1914 from among VLANs allocated to the port to which the client(s) 400 can be connected, the client 400 that is connected to this port cannot access the management VLAN. The security of the network is thus improved.

The ports configuration generation program 1090 next changes the port that is identified by the extracted port identifier p into an access port (1915), and ends the ports configuration generating processing.

Specifically, the ports configuration generation program 1090 changes the port type 11403 from "trunk" to "access" in an entry that has the extracted port identifier p as the port number 11401 in the ports configuration information 1140 that is associated with the switch 300 that is identified by the extracted switch identifier s.

Fourth Embodiment

In a fourth embodiment, this invention is applied to a network operation management system that uses a MAC VLAN method.

The network operation management system using the MAC VLAN method will be described below.

The switch 300 that has a MAC VLAN function determines to which VLAN a frame received at a port provided in the switch 300 belongs based on a source MAC address which is contained in the frame.

The switch 300 that has the MAC VLAN function can enable or disable the MAC VLAN function for each port separately.

The switch 300 that does not have the TAG VLAN function is connected to a port where the MAC VLAN function is enabled, and multiple clients 400 are connected to multiple ports provided in the switch 300 that does not have the TAG VLAN function. In this manner, multiple clients 400 are connected, through the switch 300 that does not have the TAG VLAN function, to one port where the MAC VLAN function is enabled.

The memory 3020 of the switch 300 that has the MAC VLAN function stores MAC VLAN allocation information 2300.

FIG. 23 is a diagram showing the configuration of the MAC VLAN allocation information 2300 according to the fourth embodiment of this invention.

The MAC VLAN allocation information 2300 contains a source MAC address 2301 and a VLAN identifier 2302. As the source MAC address 2301, the MAC address of the client 400 that sends a frame is registered. Registered as the VLAN identifier 2302 is the identifier of a VLAN to which the client 400 that has an MAC address indicated by the source MAC address 2301 belongs.

A description will be given next on processing of determining to which VLAN a frame received by the switch 300 that has the MAC VLAN function belongs.

The switch 300 that has the MAC VLAN function receives a frame and judges whether or not the MAC VLAN function is enabled at a port where the frame is received.

When it is judged that the MAC VLAN function is enabled at the port where the frame is received, the switch 300 obtains a source MAC address from the received frame.

Using the obtained source MAC address, the switch 300 searches the MAC VLAN allocation information 2300 for a VLAN identifier that is associated with the source MAC address. The switch 300 gives the obtained VLAN identifier to the received frame, and forwards the frame having the VLAN identifier to a VLAN that is indicated by the source MAC address.

An administrator can set the MAC VLAN allocation information 2300 stored in each switch 300 separately through a setting interface, which is provided in each switch 300.

The MAC VLAN allocation information 2300 stored in the respective switches 300 which constitute the network may be stored in the authentication server 200. In this case, data set in the MAC VLAN allocation information 2300 that is stored in the authentication server 200 is reflected on the MAC VLAN allocation information 2300 that is stored in the respective switches 300. This enables the administrator to manage, unitarily, through the authentication server 200, the MAC VLAN allocation information 2300 stored in the respective switches 300.

A description will be given on processing that is executed to determine to which VLAN a frame received by the switch 300 belongs when the authentication server 200 stores the MAC VLAN allocation information 2300.

The MAC VLAN allocation information 2300 that is stored in the authentication server 200 is generated through communications between the clients 400, the switch 300 that has the MAC VLAN function, and the authentication server 200 which employ an extensive authentication protocol (EAP). EAP is defined in IETF RFC 2284.

When one of the clients 400 is connected to the switch 300, the authentication server 200 performs client authentication on this client 400. In the client authentication, the authentication server 200 uses the MAC address of the client 400 to search the MAC VLAN allocation information 2300 that is stored in the authentication server 200 for the identifier of a VLAN to which this client 400 belongs. The authentication server 200 sends a search result containing the MAC address of the client 400 and the identifier of the VLAN to which the client 400 belongs to the switch 300.

Receiving the search result, the switch 300 extracts the MAC address of the client 400 and the identifier of the VLAN to which the client 400 belongs from the search result, and registers the extracted address and identifier in the MAC VLAN allocation information 2300 that is stored in this switch 300.

Figure 24:
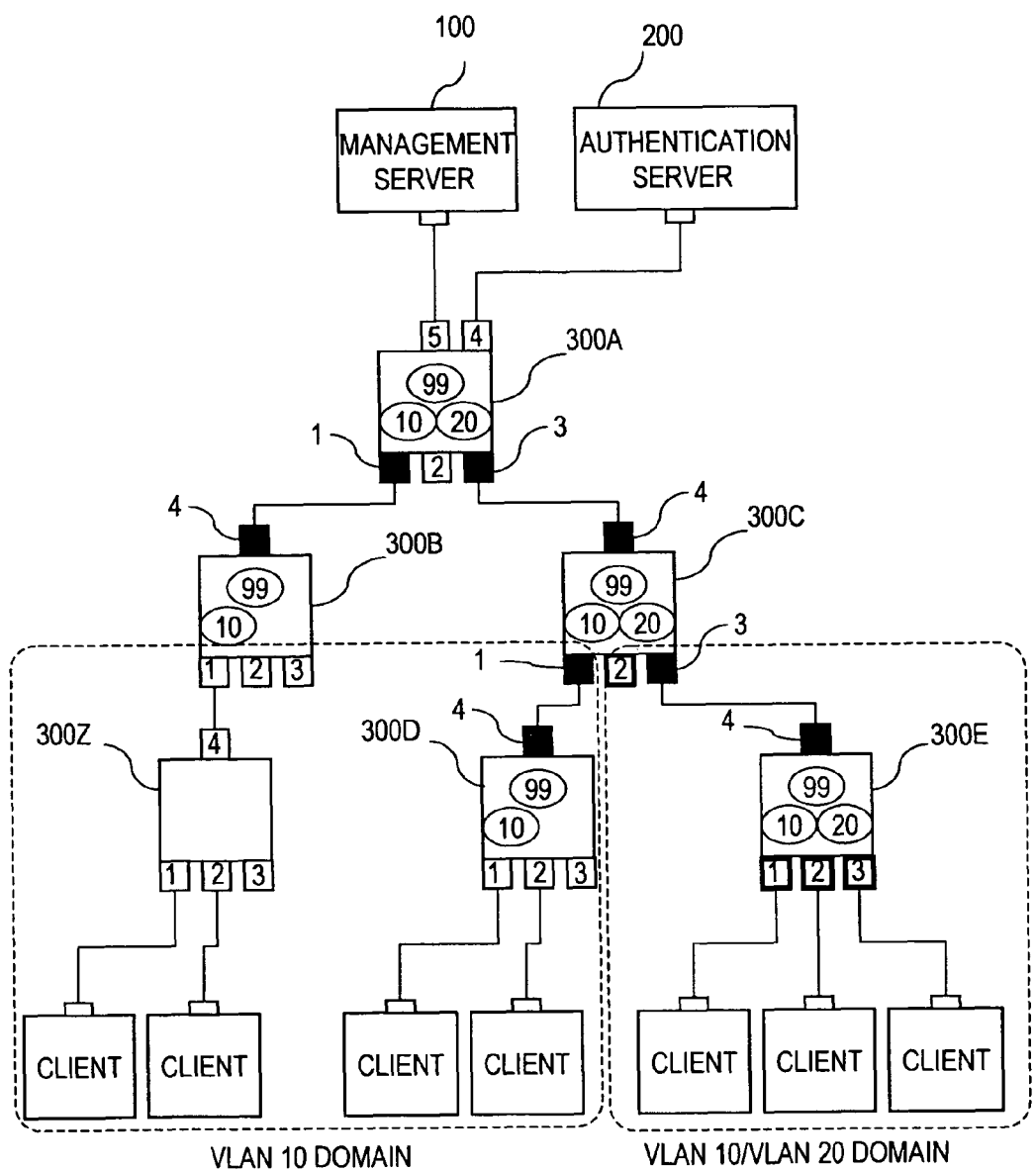
FIG. 24 is a diagram showing a configuration of a network operation management system that uses the MAC VLAN method according to the fourth embodiment of this invention.

FIG. 24 is a diagram showing a configuration of a network operation management system that uses the MAC VLAN method according to the fourth embodiment of this invention.

In the network operation management system shown in FIG. 24, a new switch 300E is connected to a port 3 provided in a switch 300C. At a port 2 and a port 3 provided in the switch 300C, the MAC VLAN function is enabled.

Figure 25:
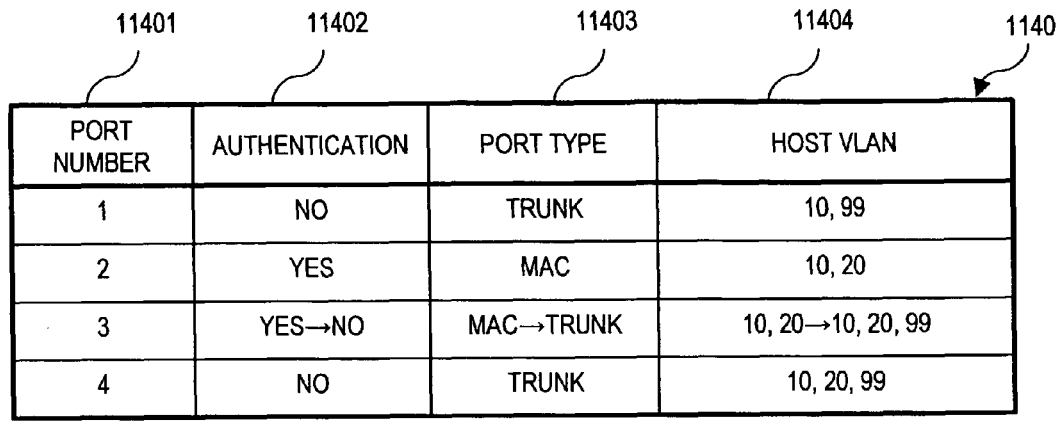
FIG. 25 is a diagram showing a change caused in the ports configuration information that is associated with the switch by the addition of the switch according to the fourth embodiment of this invention.

FIG. 25 is a diagram showing a change caused in the ports configuration information 1140 that is associated with the switch 300C by the addition of the switch 300E according to the fourth embodiment of this invention. The switch 300C will be referred to as existing switch 300C and the switch 300E will be referred to as new switch 300E.

The ports configuration information 1140 that is associated with any switch 300 that has the MAC VLAN function according to the fourth embodiment contains the port number 11401, the authentication 11402, the port type 11403, and the host VLAN 11404. The port number 11401, the authentication 11402, and the host VLAN 11404 of FIG. 25 are the same as those in the ports configuration information 1140 of FIG. 20, and their descriptions will be omitted.

As the port type 11403, "access", "trunk", or "MAC" is registered. "MAC" indicates that the MAC VLAN function is enabled at a port in question.

When the new switch 300E is connected to the port 3 provided in the existing switch 300C, the authentication 11402 is changed from "yes" to "no" and the port type 11403 is changed from "MAC" to "trunk" in an entry that has the identifier of the port 3 as the port number 11401 in the ports configuration information 1140 that is associated with the existing switch 300C.

VLAN identifiers registered as the host VLAN 11404 are changed from "VLAN10 and VLAN20" to "VLAN10, VLAN20, and VLAN99" in an entry that has the identifier of the port 3 as the port number 11401 in the ports configuration information 1140 that is associated with the existing switch 300C.

"No" is registered as the authentication 11402 and "trunk" is registered as the port type 11403 in entries that have the identifiers of the port 1 and the port 4 as the port number 11401 in the ports configuration information 1140 that is associated with the existing switch 300C.

"Yes" is registered as the authentication 11402 and "MAC" is registered as the port type 11403 in an entry that has the identifier of the port 2 as the port number 11401 in the ports configuration information 1140 that is associated with the existing switch 300C.

Figure 26:
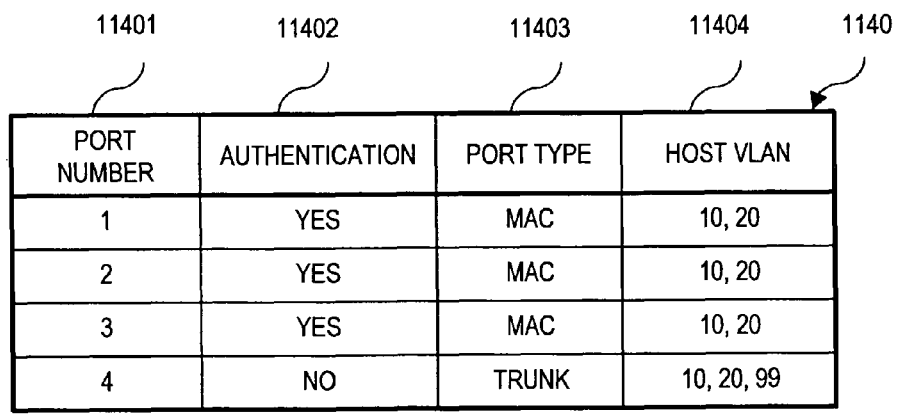
FIG. 26 is a diagram showing the ports configuration information that is associated with the new switch according to the fourth embodiment of this invention.

FIG. 26 is a diagram showing the ports configuration information 1140 that is associated with the new switch 300E according to the fourth embodiment of this invention.

When the existing switch 300C is connected to a port 4 provided in the new switch 300E, "no" is registered as the authentication 11402 and "trunk" is registered as the port type 11403 in an entry that has the identifier of the port 4 as the port number 11401 in the ports configuration information 1140 that is associated with the new switch 300E.

The identifiers of the VLAN 10, the VLAN 20, and the VLAN 99 are registered as the host VLAN 11404 in an entry that has the identifier of the port 4 as the port number 11401 in the ports configuration information 1140 that is associated with the new switch 300E.

"Yes" is registered as the authentication 11402 and "MAC" is registered as the port type 11403 in entries that have the identifiers of the ports 1 to 3 as the port number 11401 in the ports configuration information 1140 that is associated with the new switch 300E.

The identifiers of the VLAN 10 and the VLAN 20 are registered as the host VLAN 11404 in entries that have the identifiers of the ports 1 to 3 as the port number 11401 in the ports configuration information 1140 that is associated with the new switch 300E. Ports 1 to 3 provided in the new switch 300E are ports to which the clients 400 can be connected.

As in Step 1908 of FIG. 22, the management server 100 defines, to the new switch 300E, VLANs that are allocated to the port 3 provided in the switch 300C which is connected to the new switch 300E.

In Step 1909, the management server 100 allocates the identifiers of the VLANs defined to the new switch 300E to the port 4 provided in the new switch 300E and to the port 3 provided in the existing switch 300C.

Described next is an advance network designing function of the management server 100. The advance network designing function is a function that allows the administrator to design a network through the management server 100 before actually building a network. The advance network designing function can be loaded in the management server 100 of any one of the first through fourth embodiments.

The management server 100 stores a virtual network in the memory 1020. When a network is newly built and when the network is updated on the virtual network, the management server 100 generates the definition 3110 for each switch 300. The management server 100 notifies the administrator of data of the generated configuration 3110.

Figure 27:
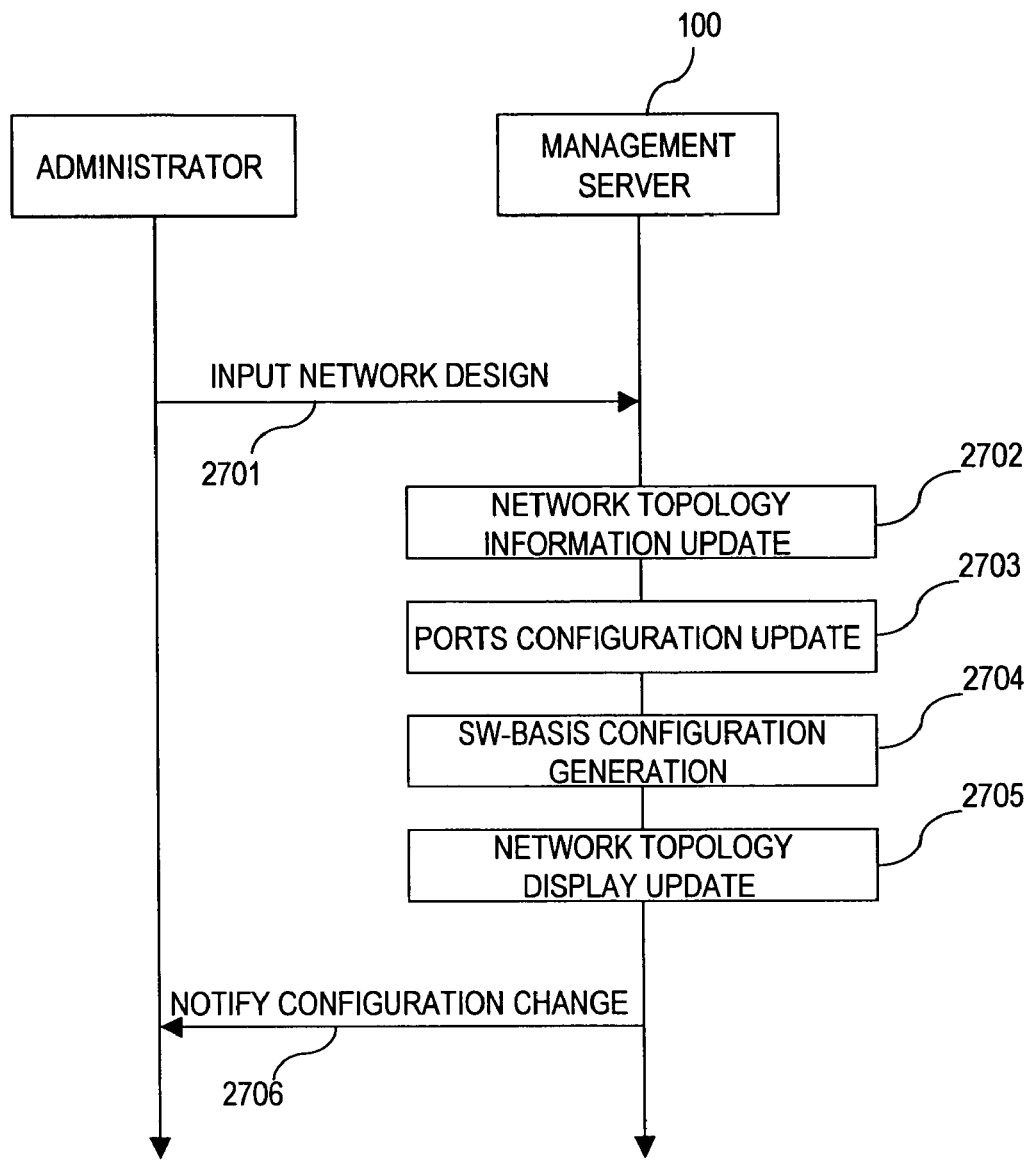
FIG. 27 is a sequence diagram of the management server in the case where a network is designed in advance according to this invention.

FIG. 27 is a sequence diagram of the management server 100 in the case where a network is designed in advance according to this invention.

The administrator inputs network design information in the management server 100 (2701). The network design information contains the link state information 500 and switches information. Specifically, the network design information contains the source switch 5001, the source port 5002, the connected switch 5003, the connected port 5004, and information about whether the added switch 300 can execute client authentication.

When the network design information is input, the management server 100 analyzes the input network design information. The management server 100 updates the network topology information 1110 and the ports configuration information 1140 in response to the result of analyzing the network design information (2702).

Based on the updated ports configuration information 1140, the management server 100 generates the configuration 1150 for each switch 300 (2703).

After generating the configuration 1150, the management server 100 updates data that shows the network topology (2704), and notifies the administrator of a result of a change caused in network topology (2705). The management server 100 can notify the administrator of a result of a change caused in network topology by, for example, displaying a notification window on the screen of a display device, or by adding a message to a log file.

The management server 100 thus updates the network topology information 1110, the ports configuration information 1140, and the configurations 1150 for the respective switches 300 based on the network design information input by the administrator. The administrator can therefore check in advance, before the switch 300 is added to or removed from the network, what processing is to be executed by the management server 100 to change the configuration of the switch 300.

While the present invention has been described in detail and pictorially in the accompanying drawings, the present invention is not limited to such detail but covers various obvious modifications and equivalent arrangements, which fall within the purview of the appended claims.

What is claimed is:

1. A management computer for managing switches included in a network, comprising:
   a processor for executing computing;
   a memory connected to the processor; and
   an interface connected to the processor and the network,
   wherein the memory stores switch configuration information for controlling the switches, network topology information indicating a connection between the switches, and ports configuration information indicating, for each switch, whether client authentication is executed at each port provided in the switch, the client authentication being processing for verifying whether a client connected to the port provided in the switch has permission to connect to the network, and
   wherein the processor is configured to:
   judge, based on the network topology information, for each port provided in each switch, whether the client authentication is executed;
   generate the ports configuration information for each switch indicating whether the client authentication is executed at each port provided in the switch based on the judgment of whether the client authentication is executed for the port;

generate, based on the generated ports configuration information, the switch configuration information; and transmit the generated switch configuration information to a first switch that includes a first port at which the client authentication is judged to be executed.

2. The management computer according to claim 1, wherein the memory stores switch information for indicating whether the switch can execute the client authentication, and wherein the processor is configured to:

judge, based on the switch information, whether it is a switch that can execute the client authentication;

judge, in a case where it is judged that the switch can execute the client authentication, based on the network topology information, for each port provided in the switch that can execute the client authentication, whether the client authentication is executed at the port; and set, in the ports configuration information, based on a result of the judging, whether to execute the client authentication at the port.

3. The management computer according to claim 1, wherein the processor is configured to:

receive link state information from a switch in the network, the link state information including an identifier of a source switch from which the link state information is sent, an identifier of a connected switch which is connected to the source switch, an identifier of one port provided in the source switch and connected to the connected switch, and an identifier of a connected port which is one port provided in the connected switch and connected to the source switch;

set the network topology information based on the received link state information;

judge, based on the set network topology information, for each port provided in the switch, whether the client authentication is executed; and set, in the ports configuration information, based on a result of the judging, whether to execute the client authentication at the port.

4. The management computer according to claim 3, further comprising an input unit, which is input the switch information and the link state information.

5. The management computer according to claim 1, wherein the processor is configured to:

receive, in a case of adding of a new switch to the network, link state information sent by an existing switch to which the new switch is connected, the link state information including an identifier of the existing switch, an identifier of an existing port provided in the existing switch and connected to the new switch, an identifier of the new switch, and an identifier of a new port provided in the new switch and connected to the existing switch;

judge, based on the received link state information, for each port provided in the new switch and the existing switch, whether the client authentication is executed; and set, in the ports configuration information that is associated with the new switch and the existing switch, based on a result of the judging, whether to execute the client authentication at the each port provided in the new switch and the existing switch.

6. The management computer according to claim 1, wherein the processor is configured to:

receive, in a case of adding a new switch to the network, link state information that indicates a connection of an existing switch to which the new switch is connected, the link state information being received from the existing switch; and set, based on the received link state information, the ports configuration information that is associated with the new switch and the existing switch such that the client authentication is executed at port provided in the new switch that can be connected to the client.

7. The management computer according to claim 1, wherein the processor is configured to:

receive, in a case of removing a switch from the network, link state information sent by an existing switch from which the removed switch is disconnected, the link state information indicating the fact that the removed switch has been disconnected from the existing switch, and including an identifier of the existing switch and an identifier of an existing port provided in the existing switch and disconnected from the removed switch;

judge, based on the received link state information, for each port provided in the existing switch, whether the client authentication is executed; and set, in the ports configuration information that is associated with the existing switch, based on a result of the judging, whether to execute the client authentication at the each port provided in the existing switch.

8. The management computer according to claim 1, wherein the processor is configured to:

receive, in a case of removing a switch from the network, link state information that indicates a connection of an existing switch from which the removed switch is disconnected, the link state information being received from the existing switch; and set, based on the received link state information, the ports configuration information that is associated with the existing switch such that the client authentication is executed at the port provided in the existing switch and disconnected from the removed switch.

9. The management computer according to claim 1, wherein the network is built such that each switch constituting the network belongs to at least one VLAN, the VLAN being identified uniquely by a VLAN identifier, wherein the ports configuration information includes at least one VLAN identifier allocated to each port, and wherein the processor is configured to:

receive, in a case of adding a new switch to the network, link state information sent by an existing switch to which the new switch is connected, the link state information including an identifier of the existing switch, an identifier of an existing port provided in the existing switch and connected to the new switch, an identifier of the new switch, and an identifier of a new port provided in the new switch and connected to the existing switch;

obtain, based on the ports configuration information that is associated with the existing switch, at least one VLAN identifier that is allocated to the existing port; and set the ports configuration information that is associated with the new switch such that the obtained at least one VLAN identifier is allocated to the new port.

10. The management computer according to claim 9, wherein the VLAN identifier includes a management VLAN identifier with which the management computer access the switches, and wherein the processor is configured to:

refer to the ports configuration information that is associated with the existing switch; and set, in a case where it is found as a result that the management VLAN identifier is allocated to one port provided in the existing switch, the ports configuration information that is associated with the new switch such that the management VLAN identifier and the VLAN identifier obtained as the at least one VLAN identifier allocated to the existing port are allocated to the new port, and the ports configuration information that is associated with the existing switch such that the management VLAN identifier is allocated to the existing port.

11. The management computer according to claim 1,
wherein the network is built such that each switch constituting the network belongs to at least one VLAN, the VLAN being identified uniquely by a VLAN identifier,
wherein the ports configuration information includes at least one VLAN identifier allocated to each port, and
wherein the processor is configured to:
receive, in a case of adding a new switch to the network, link state information sent by an existing switch to which the new switch is connected, the link state information including an identifier of the existing switch, an identifier of an existing port provided in the existing switch and connected to the new switch, an identifier of the new switch, and an identifier of a new port provided in the new switch and connected to the existing switch;
refer to the ports configuration information that is associated with the existing switch;
obtain all of VLAN identifiers allocated to all ports provided in the existing port; and
set the ports configuration information that is associated with the new switch such that the obtained all of VLAN identifiers are allocated to the new port.

12. The management computer according to claim 1,
wherein the network is built such that each switch constituting the network belongs to at least one VLAN, the VLAN being identified uniquely by a VLAN identifier,
wherein the ports configuration information includes at least one VLAN identifier allocated to each port, and a port type indicating, for each port, whether a VLAN function is enabled at the port, and
wherein the processor is configured to:
receive, in a case of adding a new switch to the network, link state information sent by an existing switch to which the new switch is connected, the link state information including an identifier of the existing switch, an identifier of an existing port provided in the existing switch and connected to the new switch, an identifier of the new switch, and an identifier of a new port provided in the new switch and connected to the existing switch;
set the ports configuration information that is associated with the existing switch such that "access" is registered as the port type of the existing port, the "access" meaning that the VLAN function is disabled; and
set the ports configuration information that is associated with the new switch such that "trunk" is registered as the port type of the new port whereas "access" is set as the port type of other ports provided in the new switch than the new port, the "trunk" meaning that the VLAN function is enabled.

13. The management computer according to claim 1,
wherein the network is built such that each switch constituting the network belongs to at least one VLAN, the VLAN being identified uniquely by a VLAN identifier,
wherein the ports configuration information includes at least one VLAN identifier allocated to each port, and a port type indicating, for each port, whether a VLAN function is enabled at the port, and
wherein the processor is configured to:
receive, in a case of removing a switch from the network, link state information sent by an existing switch from which the removed switch is disconnected, the link state information indicating the fact that the removed switch has been disconnected from the existing switch, and including an identifier of the existing switch and an identifier of an existing port provided in the existing switch and disconnected from the removed switch; and
set the ports configuration information that is associated with the existing switch such that "trunk" is registered as the port type of the existing port, "trunk" meaning that the VLAN function is enabled.

14. The management computer according to claim 13,
wherein the ports configuration information includes at least one VLAN identifier allocated to each port, and
wherein the processor is configured to:
receive, in a case of removing a switch from the network, link state information sent by an existing switch from which the removed switch is disconnected, the link state information indicating the fact that the removed switch has been disconnected from the existing switch, and including an identifier of the existing switch and an identifier of an existing port provided in the existing switch and disconnected from the removed switch;
refer to the ports configuration information that is associated with the existing switch; and
set, in a case where it is found as a result that a management VLAN identifier is allocated to the existing port, the ports configuration information that is associated with the existing switch such that the management VLAN identifier allocated to the existing port is deleted from the ports configuration information that is associated with the existing switch, the management VLAN identifier being used by the management computer to access the switches.

15. The management computer according to claim 1,
wherein the management computer is connected to an authentication server via the network,
wherein the authentication server executes authentication to verify, based on authentication request messages sent from the switches, whether the clients have right to connect to the network, and
wherein the processor sets, in a case of adding a new switch to the network, the configuration information for the new switch such that an identifier of the authentication server is included as a destination of an authentication request message that is sent by the new switch.

16. The management computer according to claim 1,
wherein, when there is not any connected switch connected to the first port or when there is a connected switch connected to the first port that cannot execute the client authentication, the processor generates the ports configuration information to indicate that the client authentication is executed at the first port.

17. A computer system, comprising:
a plurality of switches included in a network;
a management computer connected to the network, for managing the network; and
a client connected to the network,
wherein each switch has a first processor for executing computing, a first memory connected to the first processor, and ports connected to devices that access the network, wherein the management computer has a second processor for executing computing, a second memory connected to the second processor, and a second interface connected to the network, and wherein the second processor:

judges, based on network topology information, for each port provided in each switch, whether client authentication is executed, the client authentication being processing of verifying whether the client connected to the port provided in the switch has right to connect to the network generates the ports configuration information for each switch indicating whether the client authentication is executed at each port provided in the switch based on the judgment of whether the client authentication is executed for the port;

generates, based on the generated ports configuration information, the switch configuration information; and transmits the generated switch configuration information to a first switch that includes a first port at which the client authentication is judged to be executed.

18. The computer system according to claim 17,
wherein the first processor in an existing switch to which a new switch is connected sends, in a case where the new switch is added to the network, link state information for indicating a connection of the existing switch, and wherein the second processor receives the link state information and sets, based on the received link state information, the new switch such that the client authentication is executed at the port that can be connected to the client.

19. The computer system according to claim 17,
wherein the first processor in an existing switch from which a removed switch is disconnected sends, in a case where the removed switch is removed from the network, link state information for indicating a connection of the existing switch, and wherein the second processor receives the link state information and sets, based on the received link state information, the existing switch such that the client authentication is executed at one port that has been connected to the removed switch and that can now be connected to the client.

20. The computer system according to claim 17, wherein, when there is not any connected switch connected to the first port or when there is a connected switch connected to the first port that cannot execute the client authentication, the second processor generates the ports configuration information to indicate that the client authentication is executed at the first port.

* * * * *